United States Patent [19]
Bruno et al.

[11] Patent Number: 5,518,808
[45] Date of Patent: * May 21, 1996

[54] LUMINESCENT MATERIALS PREPARED BY COATING LUMINESCENT COMPOSITIONS ONTO SUBSTRATE PARTICLES

[75] Inventors: Salvatore A. Bruno; Donald K. Swanson, both of Wilmington, Del.

[73] Assignee: E. I. Du Pont de Nemours and Company, Wilmington, Del.

[ * ] Notice: The portion of the term of this patent subsequent to Jun. 1, 2013, has been disclaimed.

[21] Appl. No.: 148,734

[22] Filed: Nov. 5, 1993

Related U.S. Application Data

[63] Continuation-in-part of Ser. No. 67,402, Jun. 1, 1993, which is a continuation-in-part of Ser. No. 995,647, Dec. 18, 1992, abandoned.

[51] Int. Cl.$^6$ ............................. B32B 5/16; C09K 11/08
[52] U.S. Cl. ................................. 428/323; 252/301.4 R; 252/301.5; 252/301.6 R; 252/301.4 S; 252/301.4 H; 428/330; 428/331; 428/337; 428/404; 428/406; 428/407; 428/917
[58] Field of Search ........................ 428/403, 404, 428/406, 407, 702, 917, 323, 330, 331, 337; 252/301.4 R, 301.5, 301.6 R, 301.4 S, 301.4 H

[56] References Cited

U.S. PATENT DOCUMENTS 3,275,466  9/1966  Kell ........................................ 117/33.5

(List continued on next page.)

FOREIGN PATENT DOCUMENTS

| | | |
|---|---|---|
| 266856 | 12/1990 | Czechoslovakia . |
| 338934 | 10/1989 | European Pat. Off. . |
| 2052700 | 5/1971 | Germany . |
| 2200039 | 7/1972 | Germany . |
| 2620821 | 11/1976 | Germany . |
| 2904018 | 8/1979 | Germany . |
| 2850081 | 5/1980 | Germany . |
| 3012055 | 10/1981 | Germany . |
| 3830848 | 12/1989 | Germany . |
| 48-043931 | 12/1973 | Japan . |
| 49-34204 | 3/1974 | Japan . |
| 49-067891 | 7/1974 | Japan . |
| 49-067890 | 7/1974 | Japan . |
| 50-139681 | 11/1975 | Japan . |
| 52-029478 | 3/1977 | Japan . |
| 54-107483 | 8/1979 | Japan . |
| 56-38631 | 9/1981 | Japan . |
| 57-143354 | 9/1982 | Japan . |
| 61-181889 | 8/1986 | Japan . |

(List continued on next page.)

OTHER PUBLICATIONS

Michael Bredol et al., Designing Luminescent Materials, *Advanced Materials* 3 (1991) No. 7/8, pp. 361–367.

S. A. Lipp, Chemical Vapor Deposition Of Luminescent Layers On Particles, No. 87, Oct. 5, 1976, pp. 218–219.

Ernest M. Levin, Carl R. Robbins and Howard F. McMurdie, Phase Diagrams For Ceramists, 1969, vol. II, Figs. 2388–2390.

European Search Report, Mar. 11, 1994.

Fumio Okamoto et al., Penetration Phosphors: Preparation and Cathodoluminescence Properties, Aug., 1982, vol. 21, pp. 1135–1140.

*Primary Examiner*—D. S. Nakarani
*Assistant Examiner*—H. Thi Le
*Attorney, Agent, or Firm*—Michael K. Boyer

[57] ABSTRACT

The present invention relates to a novel cost efficient luminescent composition comprising particles of a core material which have been coated with a luminescent material that is distributed in the form of a chemically homogeneous layer. The average diameter of the core particle is in the range of from about 0.5 to 20 microns, and the coating corresponds to between about 2 and 30 wt % of the total composition. The composition can be employed to form a luminescent film or layer within a plasma display panel.

19 Claims, 9 Drawing Sheets

U.S. PATENT DOCUMENTS

| | | | |
|---|---|---|---|
| 3,522,071 | 7/1970 | Yokota et al. | 252/301.4 R |
| 3,625,659 | 12/1971 | Hammond et al. | 428/403 |
| 3,676,177 | 7/1972 | Hammond et al. | 428/403 |
| 3,984,587 | 10/1976 | Lipp | 427/70 |
| 4,037,172 | 7/1977 | Filipescu et al. | 331/94.5 |
| 4,396,528 | 8/1983 | Abbott | 252/301.17 |
| 4,624,861 | 11/1986 | Yale et al. | 252/301.4 R |
| 5,082,811 | 1/1992 | Bruno | 501/134 |
| 5,145,743 | 9/1992 | Beutel et al. | 428/403 |

FOREIGN PATENT DOCUMENTS

| | | |
|---|---|---|
| 61-258892 | 11/1986 | Japan . |
| 1022987 | 1/1989 | Japan . |
| 1168074 | 10/1969 | United Kingdom . |
| 2082618 | 8/1990 | United Kingdom . |

LUMINESCENT MATERIALS PREPARED BY COATING LUMINESCENT COMPOSITIONS ONTO SUBSTRATE PARTICLES

CROSS-REFERENCE TO RELATED APPLICATIONS

This application is a continuation-in-part of U.S. patent application Ser. No. 08/067,402, filed on Jun. 1, 1993, in the names of Salvatore A. Bruno and Donald K. Swanson that in turn is a continuation-in-part of Ser. No. 07/995,647, filed on Dec. 18, 1992, now abandoned, in the names of Salvatore A. Bruno and Donald K. Swanson, and entitled "Luminescent Materials Prepared By Coating Luminescent Compositions Onto Substrate Particles"; the disclosure of the previously identified applications is hereby incorporated by reference.

FIELD OF THE INVENTION

The present invention relates to a novel, cost efficient, luminescent composition, and processes for making the composition.

BACKGROUND OF THE INVENTION

Luminescent materials or phosphors comprise a host material which together with one or more activators converts absorbed energy into radiant energy. Some of the most widely used host materials are calcium halophosphate, barium magnesium aluminate, magnesium aluminate, strontium chloroapatite, zinc silicate and the oxides, oxysulfides, phosphates, vanadates and silicates of yttrium, gadolinium or lanthanum. Commonly used activators are rare-earth ions such as europium II and III, terbium III, cerium III, and tin II. Conventionally, compounds containing the host and activator materials are mixed together by a mechanical procedure, such as milling or micronizing, and then calcined to produce fine powder phosphors of relatively uniform composition. These powders may be bonded as coatings to the surface of a substrate, typically glass, for use in a variety of applications.

Rare-earth oxide (REO) activated phosphors are used in trichromatic lamps, cathode ray tubes (CRT), color television (CTV), high definition television (HDTV) screens, among others. Many of the rare-earth oxides are very expensive and this has limited their use in a number of applications. For example, conventional three-wavelength fluorescent lamps emit white natural light by correctly blending three narrow spectral bands of blue-violet, red-orange and green. Europium II-activated barium magnesium aluminate or europium II-activated strontium chloroapatite can be used as the blue phosphor, europium III-activated yttrium oxide can be used as the red phosphor and cerium/terbium-activated magnesium aluminate can be used as the green phosphor. Such fluorescent lamps have greater color rendition, a longer useful life, and are more energy efficient in comparison to incandescent lamps. The marketability of these fluorescent lamps has been hindered, however, because of their high cost which is attributable to the necessity of using expensive rare-earth oxides.

Czechoslovakian Patent No. 266,856 B1, to Hajek et al., claims a luminescent composition comprising a silica core, on the surface of which is coated a luminescent layer of mixed rare-earth element oxides. Hajek et al, purport that this achieves a reduction in the amount of expensive rare-earth phosphors used while the required light parameters are retained. These compositions are prepared by using a rare-earth salt solution/oxalic acid diethyl ester system to precipitate rare-earth element oxalates onto the surface of activated silica particles, and subsequently calcining the oxalates to obtain an oxide luminophor. The examples in this patent describe coated silica particles in which the rare-earth phosphor layer is between about 60 and 95 wt % of the composition. At the coating thicknesses described in the examples of this patent, only a modest, if any, reduction in the consumption of expensive rare earth elements is achieved.

The disclosure of the above-identified Patent is hereby incorporated by reference.

SUMMARY OF THE INVENTION

The present invention relates to a cost efficient luminescent composition comprising fine particles of an inert core material wherein at least a portion of the surface of the particles is coated with a luminescent material which is distributed about the surface of the particles in the form of a substantially chemically homogeneous coating. The average diameter of the core particle typically ranges from about 0.5 to 20 microns, normally about 1.0 to 10 microns, and the coating normally corresponds to about 2 through about 30 wt % of the total composition.

In one aspect, the invention relates to processes for preparing the composition of this invention. In one process, a chelate solution of the luminescent precursor is decomposed at a relatively high pH while in the presence of dispersed core particles, whereby at least a portion of the core particles become coated with hydrous metal oxides of the luminescent precursor. The coated core particles can be recovered, normally washed substantially free of soluble species, dried and calcined in a manner which is sufficient to convert the precursor, i.e., hydrous metal oxides into a luminescent material.

In another process, oxalate precursors of the luminescent composition are formed by simultaneously adding aqueous solutions of an oxalic acid and at least one metal salt of the luminescent composition into a stirred aqueous slurry of the core particles. The coated core particles are recovered, normally washed substantially free of soluble species, dried and calcined in a manner that is sufficient to form and activate the luminescent material.

In yet another process, the above described chelate solution is decomposed at a relatively high pH while in the presence of dispersed core particles, treated with a source of active sulfur for converting the hydrous oxide coating to a sulfide coating, recovering the product, normally washing substantially free of soluble species, drying and calcining in a substantially nonoxidizing atmosphere, e.g., calcining with a flux such as NaCl in a substantially nonoxidizing atmosphere, to activate the luminescent material.

The composition of the invention may be used as a cost effective substitute for conventional phosphors, e.g., rare earth phosphors. For example, the composition of the invention can be adhered, or applied onto the surface of a substrate, e.g., a glass substrate. In some cases, the composition may be a component of one or more layers which are adhered to a substrate. Such coated substrates are useful in trichromatic lamps, cathode ray tubes (CRT), color television (CTV), high definition television (HDTV) screens, flat panel displays such as plasma display panels, among many other uses.

The present invention solves the problems which are associated with known luminescent materials by improving the cost effectiveness of rare-earth components in luminescent materials, e.g., the present invention achieves luminescence by using a luminescent coating instead of bulk particles.

Conventionally it was believed that luminescent materials which are relatively small particles, e.g. less than 5 microns, were inefficient. Notwithstanding conventional beliefs, the average crystallize size of the present luminescent material upon the core particle can be less than 5 microns, e.g., less than about 0.5 micron, and obtain an acceptable R(I), e.g., a R(I) similar to conventional materials. Accordingly, the results which are achieved by the present invention are surprising and unexpected in comparison to conventional luminescent materials.

DETAILED DESCRIPTION

Figure 1:
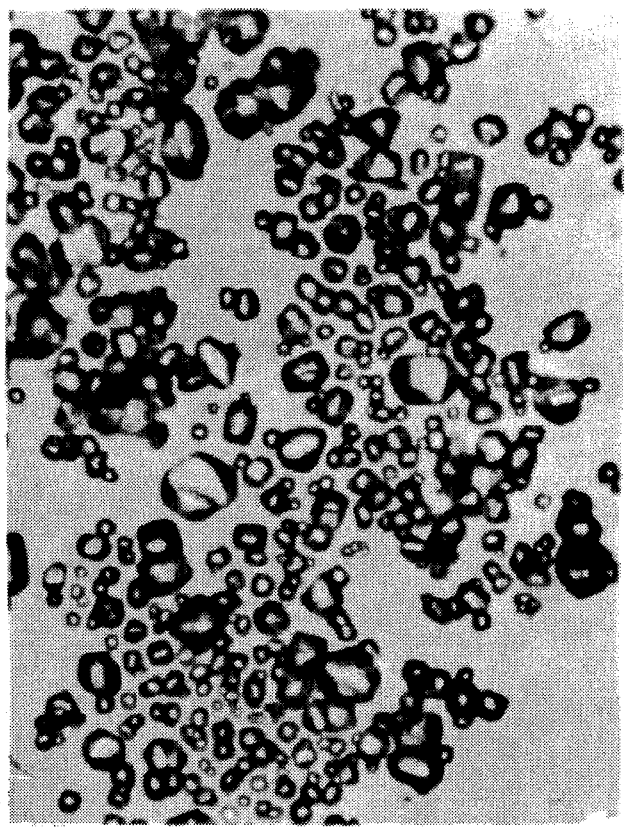
FIG. 1—FIG. 1 is an optical photomicrograph at 600× magnification of a portion of a commercially available bulk phosphor powder.

The present invention relates to a cost efficient luminescent composition comprising particles of an inert core material the surface of which has been at least partially coated with a luminescent material in the form of a substantially chemically homogeneous coating. The average diameter of the core particle typically ranges from about 0.5 to at least about 20 microns, normally about 1.0 to about 10 microns, and the coating corresponds to between about 2 to about 30 wt % of the total composition.

In one aspect, the invention relates to a process for preparing the luminescent composition which comprises decomposing a solution of chelated metal luminescent precursors at high pH while in the presence of dispersed inert core particles wherein at least a portion of the particles become coated with hydrous metal oxides, recovering the coated particles, normally washing the particles substantially free from soluble species, drying; and calcining.

In another aspect, a hydrous oxide coating upon the core particles is substantially converted to a sulfide coating by being treated with a source of active sulfur. For example, the source of active sulfur can comprise at least one water soluble member from the group of sodium sulfide, potassium sulfide, ammonium sulfide, mixtures thereof, among others.

In yet another aspect, the invention is a process comprising preparing an acidic solution of at least one metal oxide along with a solution of an oxalic acid, adding the solutions to a slurry of dispersed particles wherein at least a portion of the particles become coated with metal oxalates, recovering the oxalate coated particles, washing the particles substantially free from soluble species, drying the oxalate composition, and calcining to form and activate the luminescent material. By "activate" it is meant that at least a portion of the coated particles, e.g., a calcined coating upon the particle, becomes luminescent when excited by a suitable energy source.

In a further aspect of the invention, a luminescent composition can be obtained by dry or wet mixing core particles with metal oxalate powders and/or bulk phosphor powders, and calcining the mixed powders. The calcination temperature should be sufficient to cause 1) formation of a luminescent material coating over at least a portion of the core particle's surface, and; 2) activate the luminescent coating on the particle.

Still further, the core particle may be coated by using an appropriate vapor deposition method. The core particles may be exposed to a vapor, which contains a precursor of a luminescent material, that is deposited upon at least a portion of the core particle's surface. For example, a vapor precursor of the luminescent material may be passed through a chamber which contains the core particles. In some cases, a volatile source, e.g., a material that decomposes when heated, of the vapor precursor may be used for in situ generation of the vapor precursor. While any suitable vapor precursor of the luminescent material may be employed, for best results the vapor precursor should neither interact with the core particle nor adversely affect further processing of the coated core particle.

The novel composition of the invention is a cost efficient luminescent composition comprising a core material or particle typically having an average diameter in the range of from about 0.5 to about 20 microns; normally about 1.0 to about 10.0 microns. At least a portion of the surface of the core particle has been suitably coated with a luminescent material which is distributed about the particle in a substantially chemically homogeneous layer wherein the layer corresponds to about 2 through about 30 wt %, usually between 5 and 20 wt % of the total composition. While the luminescent material need not completely cover the entire surface of the core particles, the quantity of luminescent material should be sufficient to provide a R(I) spectrum which is substantially equivalent to conventional phosphor materials, e.g., the composition of the invention achieves about 50 to about 90% of the R(I) exhibited by conventional bulk phosphor materials. For example, at least a portion of the luminescent material may comprise a layer of generally interconnected or dispersed luminescent crystallites.

While the composition of the luminescent coating is typically substantially homogeneous, the composition of at least a portion of an individual luminescent crystallite may deviate, e.g., the activator concentration may vary throughout a crystallite. In some cases, the crystallite surface may be relatively rich in one or more activators, e.g., the Eu/Y ratio at the surface of an $Eu:Y_2O_3$ crystallite may be greater than at the crystallite's center. An increased surface concentration of one or more activators on the crystallite may enhance the effectiveness of the luminescent composition.

The luminescent composition of the invention is characterized by a relative luminescent intensity R(I). The R(I) of an emission peak is defined as the number of counts observed at the peak's maximum height divided by the number of counts measured at a reference detector from a split portion of the excitation intensity for a given spectrometer configuration. However, merely reporting the R(I) for a given phosphor, without more information, may be misleading because the R(I)s which are generated by a spectrometer typically are unique for that spectrometer. For example, two different spectrometers, which have identical settings, may produce two distinct R(I) spectrums for the same powder. A more useful R(I) can be obtained by generating the R(I) spectrum, for a powder being tested, opposite at least one standard reference phosphor of similar composition (refer to FIGS. 6, 8, and 11 which are discussed below in greater detail).

The quantity of luminescent material and the activator concentration within the coating upon the core particles can be tailored in order to obtain a predetermined intensity. However, the quality of the luminescent coating may not be desirable at loadings above about 30 wt % of the total composition, e.g., such loadings may induce agglomeration of the luminescent material and/or the formation of fine particulate debris. For best results, the loading of coating material ranges from about 5 through about 20 wt % of the total composition which typically achieves the optimal combination of raw material cost and luminescent intensity. It will be appreciated, however, that this optimal loading will vary with 1) the size of the core particles, 2) the relative densities of the core and luminescent coating, 3) factors relating to the end use application, among other factors. It is important to distinguish between the quantity of luminescent material that is used to obtain the present coating, and the total amount of such material which is present in conventional phosphors. For example, the concentration of luminescent activator in the present coating may be greater than the concentration of such an activator throughout conventional bulk phosphors; however, the total weight of luminescent activator is normally less in the present composition than in conventional phosphors. In particular, the invention may obtain a composition comprising a calcined core particle, which has been coated with a quantity of at least one luminescent material, that is sufficient to obtain an R(I) that is at least about 60% of the luminescent material.

The luminescent coating of the invention may include at least one activator such as a member selected from the group of rare earth elements such as cerium and terbium, tin II, antimony III, Cu, Ag, Mn, among others, and at least one suitable host material. A suitable host material may comprise at least one member from the group $Y_2O_3$, $YVO_4$, $Sr_2P_2O_7$, $(Ca,Sr)_5(F,Cl)(PO_4)_3$, ZnS, $Y_2O_2S$, $MgAl_{11}O_{19}$, $BaMg_2Al_{16}O_{27}$, among others.

The characteristics of the core material or particle are a key aspect of the invention. For best results, the core particle is substantially inert. By "inert", it is meant that the core particle substantially avoids reacting with the luminescent coating in a way that adversely impacts luminescence. Because many luminescent compositions are typically heated to temperatures greater than about 1000° C. in order to activate the luminescent material, it is particularly important that the core material be substantially stable and non-reactive at such temperatures. Relatively low levels of certain undesirable impurities can significantly diminish luminescence and, accordingly, for best results, the core composition should be substantially completely devoid of such impurities or such impurities are substantially prevented, if present, from being extracted into the luminescent layer.

Moreover, these undesirable impurities may cause poisoning, e.g., non-radiative energy transfer in the form of vibrational energy. Ions that have non-radiative transitions to their ground state, and which should be avoided in the preparation of the present composition include $Fe^{2+}$, $Co^{2+}$, $Ni^{2+}$, $Al^{+3}$, $Si^{+4}$, among others. In some cases, the sensitivity of a luminescent material to a poison varies inversely with the activator concentration, e.g., alkaline earth metals may poison certain luminescent materials. An s-center phosphor can typically tolerate about 100 times more of a given poison than an i-center phosphor. An s-center refers to a substitutional activator such as Eu substituting for Y in $Eu:Y_2O_3$, whereas an i-center refers to an interstitial activator atom as is postulated to be the case for Cu activated ZnS.

Any poisons that are present in the composition may reduce luminescence efficiency by:

1. Decreasing the solubility of the activator compound in the host crystal during formation of the phosphor,
2. Absorbing primary excitation energy directly and converting the energy into heat,
3. Dissipating (as heat) excitation energy which has been absorbed by the host crystal and is intercepted by the poison center while the excitation energy is en route to or from activator centers,
4. Interfering with activator centers, so as to increase their probability of making nonradiative transitions, for example, by lowering the crossover point between the excited and ground-state potential energy curves of the luminescent composition,
5. Taking excitation energy from nearby activator centers, by q-overlap energy transfer, and converting the potential luminescence energy into heat, and;
6. Optically absorbing luminescence radiation which is seeking to escape from within the phosphor crystal.

The suitability of the particles of core material can also be determined, in part, by the composition of the luminescent coating and the potential for an undesirable interaction between the two. In some cases, the core material should not absorb light at the frequencies of interest, e.g., the activating radiation and emitted radiation. However, such absorption may be desirable when providing a plurality of coatings, and/or coatings containing more than one luminescent material, upon the core particles. In general, the core should avoid adversely effecting any electrical processes which are associated with operating a light-emitting device.

Typically, water-soluble core materials will be unsatisfactory for use in this invention; although such materials may be satisfactory for use in non-aqueous coating processes provided they are otherwise acceptable. In any event, normally unacceptable core particles can be rendered suitable for use in the invention by being coated with a substance which substantially counteracts or eliminates the unsatisfactory property. For example, normally unacceptable particulate core materials can be rendered suitable for use in the invention by applying a coating of a suitable core material that would serve as an "inert" barrier between the core particle material and the luminescent coating. Moreover, whether or not a core material, or a barrier coated core material is suitable for use in the present invention is dependent upon the particular luminescent material being coated upon the core material and, accordingly, for best results, the core material which is employed in the invention is one that is inert with respect to a specific luminescent coating. Suitable particulate core particles comprise at least one member selected from the group of alkaline earth sulfate, alkaline earth phosphate, metal silicate, metal oxides such as aluminum oxide, magnesium oxide (MgO), mixed metal oxides, alkaline earth fluoride, mixtures thereof, among others. Normally, best results are obtained by employing core particles comprising one or more of $BaSO_4$, CaO, $CaF_2$ and $CaSO_4$.

The core particles are usually essentially iso-dimensional, and typically have an average diameter between about 0.5 to 20 microns, and normally from about 1.0 to 10.0 microns. It is desirable for the core particles to be characterized by a relatively narrow particle size distribution and a small average particle size. For example, a desirable distribution is one wherein about 90% of the core particles have a diameter which ranges from about 0.1 D to 10.0 D ("D" is defined as the weight average particle diameter). A narrow particle size distribution is particularly advantageous when employing the inventive composition as a luminescent material in fluorescent lamps, television screens, flat panel displays, among others. Without wishing to be bound by any theory or explanation it is believed that a narrow particle size distribution improves particle packing efficiency, and a small particle size reduces the amount of luminescent material necessary to effectively coat a substrate.

Average particle size and particle size distribution can be determined by methods described in "Measurement of Suspended Particles by Quasi-Electric Light Scattering", E. B. Dahneke, Wiley Interscience, N.Y. 1983; which is hereby incorporated by reference. Particularly useful for performing these methods is the Microtrac II Small Particle Analyzer manufactured by Leeds Northrop and Company.

The exterior surface of the core particle is coated with a substantially chemically homogeneous layer comprising a luminescent material which typically corresponds to between about 2 and 30 wt %, and normally about 5 to 20 wt % of the total composition. The coating materials may comprise at least one member selected from the (host:activator) group of $(Y_2O_3:Eu)$, $(Y_2O_2S:Eu)$, $(YVO_4:Eu)$, $(La, Ce,Tb)(PO_4)_3:(Ce,Tb)$, $(Zn_2SiO_4:Mn)$, $(BaMg_2Al_{16}O_{27}:Eu)$, $(SrB_4O_7:Eu)$, $MgAl_{11}O_{19}:CeO_{.65}TbO_{.35}$ (ZnS:Cu), (ZnS:Ag), barium titanium phosphate, $MgWO_4$, Sn and Eu activated alkaline earth ortho and pyrophosphates, Sb and/or Mn activated calcium halophosphates, mixtures thereof, among others. Particularly useful coating materials are $(Y_2O_3:Eu)$, $(YVO_4:Eu)$, $(BaMg_2Al_{16}O_{27}:Eu)$, $(CeO_{.65}TbO_{.35}MgAl_{11}O_{19})$, (ZnS:Cu), (ZnS:Ag), and mixtures thereof e.g., these coating materials can be used in a number of commercial applications such as lamps, TV screens, flat panel displays such as plasma display panels, among others. The luminescent material is normally present as interconnected or dispersed crystallites about the surface of the core particles, whereas in some cases the core particles may be crystalline and/or amorphous.

A composition of the invention may be prepared in a variety of ways. One process utilizes a chelate precursor of the luminescent components as a carrier to deposit the luminescent precursor as a hydrous metal oxide and/or metal oxide onto slurried core particles. In another process, a luminescent precursor is precipitated as an oxalate onto a slurry of core particles. During subsequent calcination, the deposited hydrous metal oxide, oxalate, among others, can be activated to form a luminescent coating upon the surface of the core particles. In some cases, at least one of the components being deposited or precipitated onto the core particles is present within a solution comprising an acid, e.g., hydrochloric acid, wherein the luminescent precursor is deposited by increasing the pH.

In one aspect of the invention, a luminescent composition can be obtained by dry or wet mixing previously coated and/or uncoated core particles with metal oxalate powders and/or bulk phosphor powders, and calcining the mixed powders. The calcination temperature should be sufficient to cause 1) formation of a luminescent material coating over at least a portion of the core particle's surface, and; 2) activate the coated particle. Typically, the calcination temperature ranges from about 700° to about 1,400° C., and normally 1,000° to 1,200° C.

In another aspect of the invention, the core particle may be coated by using an appropriate vapor deposition method. The core particles may be exposed to a vapor, which contains a precursor of a luminescent material, that is deposited upon at least a portion of the core particle's surface. For example, a vapor precursor of the luminescent material may be passed through a chamber which contains the core particles. In some cases, a volatile source, e.g., a material that decomposes when heated, of the vapor precursor may be used for in situ generation of the vapor precursor. While any suitable vapor precursor of the luminescent material may be employed, for best results the vapor precursor should neither interact with the core particle nor adversely affect further processing of the coated core particle.

In another process of the invention, the luminescent precursor is deposited as a hydrous oxide onto at least a portion of the surface of slurried core particles. If desired, the hydrous oxide can be converted to a sulfide by exposure to a source of active sulfur, e.g., treatment with a solution comprising sulfur salts such as potassium, ammonium, and sodium sulfides. The treated hydrous oxide coating may be converted to a sulfide coating by being heated to a temperature of at least about 90° C. The sulfide coated particles can be isolated, washed to substantially remove soluble species, dried, e.g., at a temperature of about 120° C., and admixed with a second sodium salt such as sodium chloride, e.g., about 2 to 20 wt % dry NaCl is added to the dried sulfide coated particles. A subsequent calcination step at a temperature of about 800° to at least about 1000° C. in a non-oxidizing atmosphere, e.g., nitrogen, generates formation of a sulfide-containing luminescent coating about the core particle. Optionally, the sulfide coated particles may be washed for removing the second sodium salt.

In a further aspect of the invention, the core particle may be converted when exposed to relatively high temperatures, e.g., above about 900° C. or a calcination temperature sufficient to activate the luminescent material. For example, a core particle can be converted or decomposed to form a metal oxide. Any suitable convertible core particle can be used which 1) possesses a conversion temperature lower than the luminescent material's activation temperature, and; 2) is inert or capable of being rendered inert. Specific examples of suitable core particles comprise at least one of $CaCO_3$, $MgCO_3$, among others. The luminescent compound can be deposited upon a convertible core particle in accordance with one or more of the previously described methods that is suitable for the selected core particle, and calcined. During the calcination step, at least a portion of the convertible core particle becomes a metal oxide such as CaO, MgO, among others. Without wishing to be bound by any theory or explanation, it is believed that at least a portion of the convertible core particle is released, for example, as $CO_2$, thereby forming a metal oxide. It is also believed that the metal oxide may be converted further as a result of being exposed, for example, to water and carbon dioxide in the atmosphere. For example, the metal oxide may be converted to a hydroxide form, e.g., CaO can be converted to $Ca(OH)_2$. The later conversion process may be useful for cementing or fixing the luminescent material to the core particle.

A method that is particularly useful for depositing a substantially chemically homogeneous coating on a particulate substrate is described in U.S. Pat. No. 5,082,811 entitled "Ceramic Dielectric Compositions And Method For Enhancing Dielectric Properties"; the disclosure of which is incorporated herein by reference.

A process of the present invention comprises the following steps:

(a) preparing an agitated aqueous or aqueous organic slurry of core particles;

(b) adding a solution comprising metal chelates of luminescent precursors to the agitated slurry;

(c) raising the pH of the slurry above about 9 by adding a basic substance;

(d) heating the slurry to a temperature of from about 50° C. to reflux, and maintaining the temperature for a period of about 1 to 8 hours, normally 4 to 8 hours, to decompose at least a portion of the metal chelates, thereby depositing a coating of luminescent precursors onto at least a portion of the surface of the particles;

(e) recovering, normally washing and drying the coated particles; and (f) calcining the dried powder under appropriate conditions to activate the coating upon the particles.

The above-identified slurry of core particles may be prepared with a fluid selected from mixtures of deionized water with at least one water miscible organic liquid which does not adversely interact with the core particles or the luminescent precursor coating. For example, the water miscible organic fluid may be selected from at least one of C1–C4 branched or straight chain alcohols, glycols, mixtures thereof, among others.

A solution comprising metal chelates of the luminescent precursor, at least one suitable chelate solvent, and at least one chelating agent, is prepared. By "chelating agent", it is intended to refer to one or more polydentate ligands whose structure permits the simultaneous attachment of two or more donor sites onto the same metal ion, thereby forming a closed ring structure. A "ligand" is defined as any atom, ion, or molecule which is capable of functioning as a donor partner in one or more coordinate bonds. Chelating agents useful in practicing the invention comprise at least one member from the group of alphahydroxycarboxylic acids, such as lactic, glycolic, malic and citric acid or alphaaminocarboxylic acids, such as ethylene diamine tetracetic acid (EDTA), glycine, mixtures thereof, among others. A solution of the chelating agent is prepared using a solvent, for example, deionized water or mixtures of deionized water with water miscible solvents such as methanol, ethanol, isopropanol, mixtures thereof, among others. The solvent may optionally contain small amounts of wetting agents or surfactants for enhancing dissolution of the metal compounds.

The quantity of chelating agent should be sufficient to create a solution comprising metal chelates. The appropriate metal compound(s) can be stirred into the above described chelating agent and solvent solution. The metal compounds comprise the general formula, MXn, wherein "M" is a metal cation comprising at least one member selected from the group of magnesium, aluminum, zinc, copper, silver, calcium, strontium, barium, antimony, manganese, vanadium, tantalum, tungsten, yttrium, lanthanum, terbium, europium, lutetium, mixtures thereof, among others; wherein "X" is an anion or a radical selected from $HCO_2$—, $CH_3CO_2$—, —OH, —OR, —$NO_3$ and —Cl, mixtures thereof, among others; and "n" is a whole number which ranges from 1 through 6 and is a function of the valence state of the metal cation $M^{+n}$. Certain metal oxides, which are soluble in mineral acids, may also be used as a source of the metal cation, e.g., $Y_2O_3$, $Eu_2O_3$, ZnO, $Sb_2O_3$, $V_2O_5$, mixtures thereof, among others.

The pH of the previously described solution is adjusted to a value which ranges from about 5 through at least about 10; typically by adding a strong base selected from ammonium hydroxide, tetramethyl-ammonium hydroxide, sodium hydroxide, potassium hydroxide, mixtures thereof, among others. Normally, a pH between 5 to 8 is suitable for obtaining a stable solution of metal chelates. While the solution pH is a key factor which determines whether or not a stable solution of metal chelates is obtained, other important factors include the metal compound, valence state of the metal compound, chelating agent, among other factors. By appropriately adjusting the pH of the solution, the chelating agent is capable of forming soluble chelates with metal cations which were provided by the metal compound.

It is desirable that the metal compounds be substantially completely dissolved in the solution, and that the quantity of chelating agent be sufficient to accomplish substantially complete dissolution. In some cases, a relatively clear solution is obtained by adding the chelating agent after introducing the metal compounds to the solution.

After adding the solution of metal chelates to the slurry of core particles, the pH of the slurry can be increased to greater than about 9, typically above about 10, by adding a strong base, e.g., potassium hydroxide and/or sodium hydroxide. The slurry may be heated to a temperature in the range between about 50° C. to reflux, and maintained for a period of up to about 8 hours, typically for at least 4 hours, in order to decompose the metal chelates, thereby depositing a generally chemically homogeneous coating of the luminescent precursor material upon the surface of the core particles. Ammonium hydroxide may also be employed as a base. If ammonium hydroxide is employed, then a relatively high temperature may be required to decompose the metal chelates. Typically, decomposition can be accomplished by heating the slurry of core particles in an autoclave at a temperature of from about 100° C. to at least about 200° C. When sodium hydroxide is employed for converting the metal chelate to form a corresponding hydrous metal oxides and/or metal oxides, the conversion can be illustrated by the following equation:

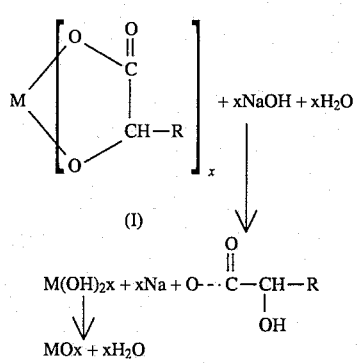

$$M(OH)_2x + xNa + O-C-CH-R$$ (with formula I + xNaOH + xH$_2$O yielding product with OH group)

$$\downarrow$$

$$MO_x + xH_2O$$

wherein, for example, lactic acid R is $CH_3$—, or for example, malic acid R is —$CH_2COO^-Na^+$.

By controlling the reaction conditions, hydrous metal oxides and/or metal oxides of a luminescent precursor can be deposited upon at least a portion of the surface of the core particles. The coated core particles can be recovered by filtration or centrifugation, and normally washed several times with deionized water to substantially remove any soluble organic or inorganic materials, if any, and dried in an air or vacuum oven.

The dried coated powder can then be calcined at a temperature, for example, in the range of about 700° to 1,400° C., normally about 1,000° to 1,200° C., which is sufficient to activate the coating of luminescent precursor. Normally, the luminescent material is crystalline, e.g., the luminescent coating comprises interconnected or dispersed crystallites upon the surface of the core material.

The optimum calcination temperature for activating the luminescent precursor and thereby form the luminescent material, may require operation within an oxidizing, a reducing or an inert environment. The specific calcination conditions are selected in order to optimize luminescent intensity and particle size distribution. For any particular composition, the R(I) of the luminescent material is normally a function of the calcining temperature. As a result, the calcining step can be used for tailoring the characteristics of the inventive composition.

It can be advantageous to calcine the core particles, e.g., BaSO$_4$, and optionally mill the calcined particles, e.g., the calcined particles may be hammer milled or ball milled. The calcined particles are then ready to be coated with a luminescent precursor. Calcination and milling produces a final product which possesses a relatively narrow particle size distribution (PSD), and reduces the average particle size. Without wishing to be bound by any theory or explanation, it is believed that calcining the core particles, prior to applying the luminescent coating, reduces formation of intractable agglomerates when the luminescent coated core particles are again calcined for activating the coated particles. For example, a calcined/milled BaSO$_4$ core particle, which is acid washed by slurrying in a mineral acid, e.g. HCl, to substantially remove undesirable acid soluble species, may achieve a conductance of less than about 50 umhos, resulting in an enhanced R(I) for the subsequent coated luminescent phosphor composition.

The composition of the coated powders can be determined by using x-ray fluorescence analysis, or inductively coupled plasma (ICP) analysis. The crystalline phase core material or the luminescent coating may be determined by x-ray diffraction analysis. The characteristics of the surface coating may be ascertained by optical microscopy, transmission electron microscopy (TEM) and energy dispersive spectroscopy (EDS). Surface areas can be determined by single point B.E.T. on a Micromeritics Flowsorb II 2300, and particle size can be determined on a Microtrac II Small Particle Analyzer.

The relative intensity, R(I) of the coated core material can be measured using an SLM-8000 fluorescent spectrometer. The relative intensity can be measured by loading the coated particles into a quartz cuvette, and centering in the sample holder of the instrument. The excitation wavelength, which is typically used to excite most photoluminescent compositions in a fluorescent lamp, is about 254 nm, which is the primary wavelength emitted by a mercury vapor discharge lamp. In a fluorescent spectrometer, the excitation wavelength is typically generated by a xenon lamp and a double-grating excitation monochromator. The R(I) of each sample is measured four times, one measurement for each face of the quartz cuvette, and the average value is calculated, i.e., an average value minimizes any systematic error caused by the sample holders. For certain coated particles, a bulk composition such as Y$_2$O$_3$:5 mole % Eu, which was prepared by the oxalate process described above, can be used as a standard. Prior to measuring the R(I) of the coated particles, the spectrometer is configured to give an R(I) value of about 2.1 for this standard.

While particular emphasis in the above description has been placed on coating a single luminescent precursor about a core particle, it is to be understood that the invention covers a plurality of luminescent coatings, e.g., the luminescent material may comprise a plurality of, for example, successive coatings that absorb and/or emit the same and/or different colors. In some case, a previously coated core particle can be coated further to obtain a composition which emits light having certain characteristics, e.g., a core particle having a red-emitting phosphor coating is coated again with a green-emitting phosphor.

Further, the invention may be employed to provide a mixed composition luminescent coating, e.g., a coating comprising at least one layer which includes a plurality of luminescent materials. Subsequent to forming the inventive composition, the composition may be treated or tailored by a post-treatment which, for example, protects the luminescent coating from degradation, attack from moisture, among others. For example, a composition of the invention can be modified by being coated with silica, thereby minimizing any reaction of the composition after the composition has been placed into service, e.g., used as a phosphor in a fluorescent lamp. In some cases, it can be desirable to employ a mechanical mixture of luminescent coated particles which have distinct sizes, compositions, among other characteristics. Accordingly, by appropriately selecting a core material(s), luminescent coating(s), coating process, mixtures of coated materials, and optional post-treatments, the luminescent composition of the invention can be tailored to satisfy a virtually unlimited array of end product applications.

The following examples are provided to illustrate certain aspects of the invention, and not to limit the scope of the appended claims.

Example 1

This Example describes a method for making a phosphor containing barium sulfate coated with approximately 2.04 wt % Eu$_2$O$_3$ and 24.86 wt % Y$_2$O$_3$ based on the phosphor by using a chelate process.

Deionized water (about 540 ml) and approximately 31.4 g (0.2318 mole) of D,L-malic acid were charged to a 2-liter flask under a nitrogen atmosphere at a temperature of about 23° C. A solution comprising yttrium oxide in aqueous hydrochloric acid (about 125.4 g, 19.84% $Y_2O_3$; 22.69% HCl), and a solution of europium oxide in aqueous hydrochloric acid (about 10.46 g, 19.49% $Eu_2O_3$; 20.83% HCl) were added to the 2-liter flask while being agitated; the resulting generally clear solution was allowed to agitate for about 30 min.

A sodium hydroxide solution (approximately 119.4 g, 30% NaOH, 0.8955 mole) was added to the previously described solution in a dropwise fashion over a period of about 35 minutes while maintaining a temperature of about 25° C. The resultant solution, which was generally colorless and had a pH of about 9.2, was diluted to about 1200 g by adding deionized water.

The diluted colorless solution was combined with a slurry of about 73.1 g of barium sulfate (known as Blanc Fixe Micro Grade, a precipitated barium sulfate supplied by Sachtleben Corp.), in about 300 g of deionized water. The barium sulfate for this example had a surface area of about 2.6 m2/g. The resultant mixture was agitated overnight. By means of a syringe pump, aqueous sodium hydroxide solution (about 21.1 g, 30% NaOH, 0.1583 mole), was added to the slurry over approximately 1 hr., while maintaining a temperature of about 25° C. The white slurry, which had a pH of about 11.4, was then heated under reflux, to about 100° C. for 6 hrs.

After cooling the white slurry to approximately 25° C. (pH about 10.6), a portion of the slurry was filtered, and given a 1000 ml displacement wash with deionized water. The filter cake was dried at a temperature of about 120° C., thereby producing about 59.2 g of a white solid having a surface area of about 6.3 m2/g. A portion of the white solid was ground in a mortar and pestle, and calcined in air at a temperature of about 1100° C. to produce a powder whose typical properties are summarized below.

| Calcined Relative Intensity | Uncalcined Particle Size (um) | | | Inductively Coupled Plasma (ICP) Analysis | | |
|---|---|---|---|---|---|---|
| | D90 | D50 | D10 | % $Y_2O_3$ | % $Eu_2O_3$ | % $Na_2O$ |
| 1.50 | 4.8 | 1.6 | 0.52 | 21.81 | 1.89 | 0.10 |

Figure 2:
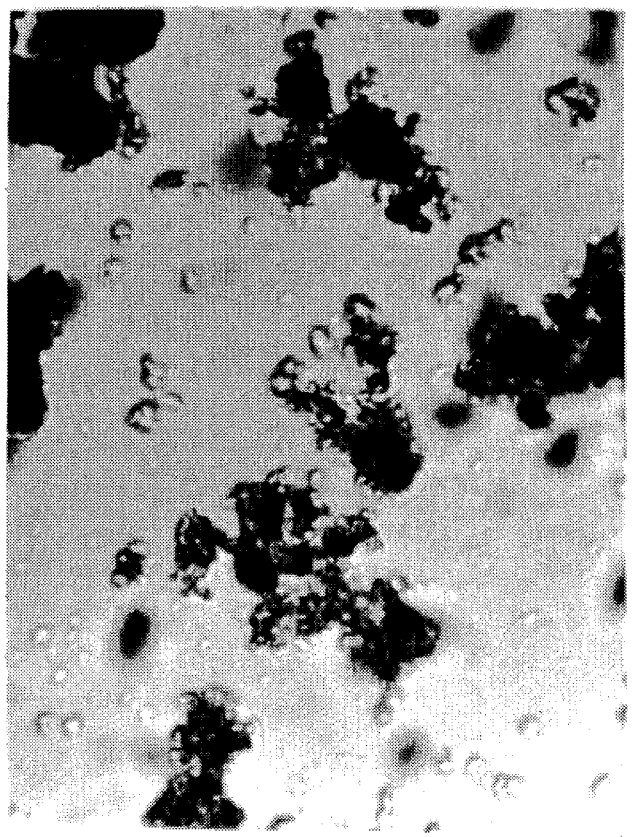
FIG. 2—FIG. 2 is an optical photomicrograph at 600× magnification of a portion of the product formed in accordance with Example 1.
Figure 3:
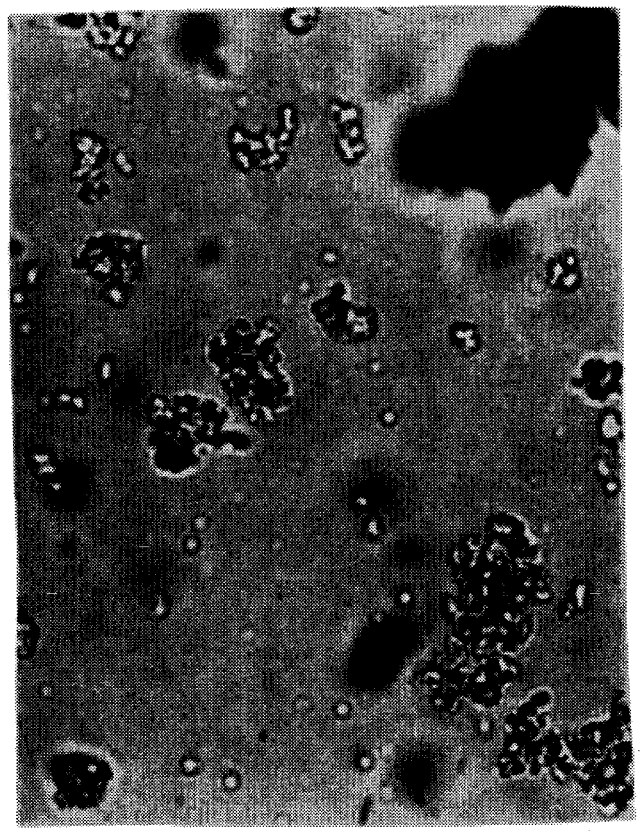
FIG. 3—FIG. 3 is an optical photomicrograph at 1000× magnification of a portion of the product formed in accordance with Example 1.

Referring now to the Drawings, FIG. 1 is an optical photomicrograph at 600× magnification of the commercially available phosphor which was used as the reference standard for the R(I) data summarized above. The commercially available material corresponds to a bulk phosphor powder comprising $Y_2O_3$ doped with approximately 5 wt. % $Eu_2O_3$, supplied by GTE, which is sold under the trademark "Sylvania Type 2340". FIG. 2 is an optical photomicrograph at 600× magnification of a portion of the powder formed in accordance with Example 1, and FIG. 3 is an optical photomicrograph at 1,000× magnification of the powder shown in FIG. 2. FIGS. 1 and 2 were taken with a NIKON optical microscope, which was equipped with a 60× ELWD (extra-long working distance) lens, by placing a small sample of the powder upon a glass slide, and immersing the powder in a drop of oil which had a refractive index of about n=1.54. A cover glass was placed over each sample and lightly pressed down so as to disperse the powder. FIG. 3 was taken with the above-identified microscope by using a 100× oil immersion lens that was immersed into a drop of oil that had been placed on top of the cover glass.

FIG. 1 shows a conventional bulk phosphor powder that has a particle size which ranges from approximately 2 to 15 microns. FIGS. 2 and 3 show $BaSO_4$ particles, which range in size from about 3 to 20 microns, that are coated with $Eu:Y_2O_3$ phosphor crystallites. The generally clear outline of the particles shown in FIGS. 2 and 3 corresponds to $BaSO_4$, whereas the relatively dark spots are crystallites of $Eu:Y_2O_3$ which were coated on the surface of the $BaSO_4$ particles.

Example 2

This example describes a method for making phosphor containing barium sulfate coated with approximately 0.76 wt % $Eu_2O_3$ and 9.24 wt % $Y_2O_3$ based on the phosphor using a chelate process.

Deionized water (about 270 ml) and approximately 20.4 g (0.1507 mole) of D,L-malic acid were charged to a 1-liter flask under a nitrogen atmosphere while maintaining a temperature of about 25° C. A solution of yttrium oxide in aqueous hydrochloric acid (approximately 62.2 g, 20% $Y_2O_3$; 22.57% HCl), and a solution of europium oxide in aqueous hydrochloric acid (approximately 5.1 g, 20% $Eu_2O_3$; 20.72% HCl), were added to the contents of the 1-liter flask while being agitated and maintaining a temperature of about 25° C. The resulting solution was allowed to agitate for about 10 min. An aqueous ammonium hydroxide solution (approximately 33.2 g, 29.2% $NH_3$, 0.5692 mole), was added dropwise over a period of about 40 min while maintaining a temperature of about 25° C. A generally colorless solution was produced, which had a pH of about 8.0, and was diluted to about 600 g by the addition of deionized water.

Barium sulfate (approximately 90 g) was slurried in 500 g of deionized water (the barium sulfate was known as Blanc Fixe Micro Grade a precipitated barium sulfate that was supplied by Sachtleben Corp., which had been calcined previously at about 900° C. for 1 hr and hammer-milled by using a Brinkmann Mill). Aqueous ammonium hydroxide (about 40 g, 29.2% $NH_3$) was added to the sulfate slurry while maintaining a temperature of about 25° C., and agitating the slurry. Agitation of the slurry was continued overnight. The slurry was heated to about 91° C., and about 446.1 g of the above-described colorless yttrium-europium chelate solution was added to the slurry over a period of about 2.5 hrs. The slurry was heated further under reflux to about 106° C. for 6 hrs.

After cooling to about 25° C., a white slurry was obtained which had a pH of about 8.6. The white slurry was filtered, and the filter cake washed with 16 liters of deionized water. The filter cake was dried to produce about 107.8 g of a white solid having a surface area of about 1.3 m2/g, and a particle size distribution of: D90, 8.49 μm; D50, 3.00 μm; and D10, 0.94 μm. A portion of the solid was pulverized by hammer milling, and calcined in air at a temperature of about 1200° C. for 1 hr. The resulting white powder had a surface area of about 0.6 m2/g, and a particle size distribution of: D90, 18.1 μm; D50, 7.13 μm; and D10, 1.62 μm.

Figure 4:
FIG. 4—FIG. 4 is an optical photomicrograph at 600× magnification of a portion of the product formed in accordance with Example 2.

Referring now to FIG. 4, FIG. 4 is an optical photomicrograph at 600× of a portion of the powder formed in accordance with Example 2. FIG. 4 illustrates a coating of relatively small phosphor crystallites upon the $BaSO_4$ particles.

Example 3

This example describes a method for making a phosphor containing barium sulfate coated with approximately 0.76 wt % $Eu_2O_3$ and 9.24 wt % $Y_2O_3$ based on the phosphor using an oxalate process.

Barium sulfate (approximately 90 g) was slurried into 1500 ml of deionized water, and the slurry was agitated at a temperature of about 25° C. for 2 days. (The barium sulfate was known as Blanc Fixe Micro Grade which is a precipitated barium sulfate supplied by Sachtleben Corp.) The slurry was heated to about 91° C.

A solution was prepared by combining solutions of yttrium oxide in aqueous hydrochloric acid (approximately 46.2 g, 20% $Y_2O_3$; 22.57% HCl), and europium oxide in aqueous hydrochloric acid (approximately 3.79 g, 20% $Eu_2O_3$; 20.72% HCl), with about 50 ml deionized water which had a temperature of about 25° C. A second solution was prepared by dissolving about 17.9 g (0.1422 mole) of oxalic acid dehydrate into about 46 ml of deionized water which had a temperature of about 60° C. The barium sulfate slurry was heated to about 91° C., and the two previously described solutions were added simultaneously to the sulfate slurry over a period of about 2 hrs. The resulting slurry was heated further under reflux to a temperature of about 102° C. which was maintained for about 6 hrs.

After cooling to about 25° C., a white slurry was obtained which was filtered, and the filter cake washed with 10 liters of deionized water. The filter cake was dried at about 120° C. to obtain about 106.6 g of a white solid having a surface area of about 3.1 m2/g. A portion of the powder was calcined in air at a temperature of about 1,100° C. for 1 hr. to produce a white powder.

Figure 5:
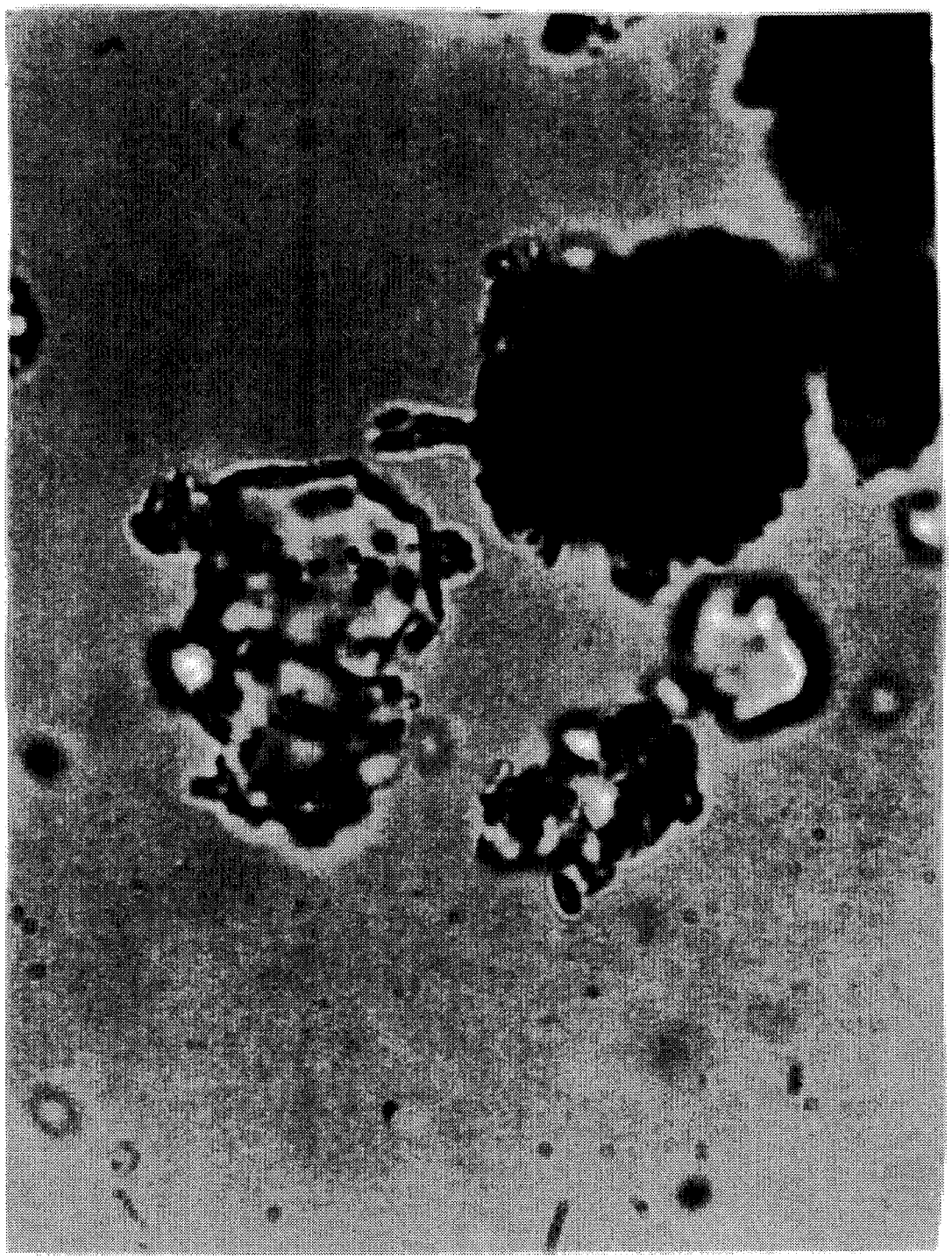
FIG. 5—FIG. 5 is an optical photomicrograph at 1000× magnification of a portion of the product formed in accordance with Example 3.

Referring now to FIG. 5, FIG. 5 is an optical photomicrograph at 1,000× magnification of a portion of the powder formed in accordance with Example 3. FIG. 5 shows one $BaSO_4$ particle which essentially has no coated phosphor crystallites, and another adjacent particle that is substantially completely coated with phosphor crystallites.

Figure 6:
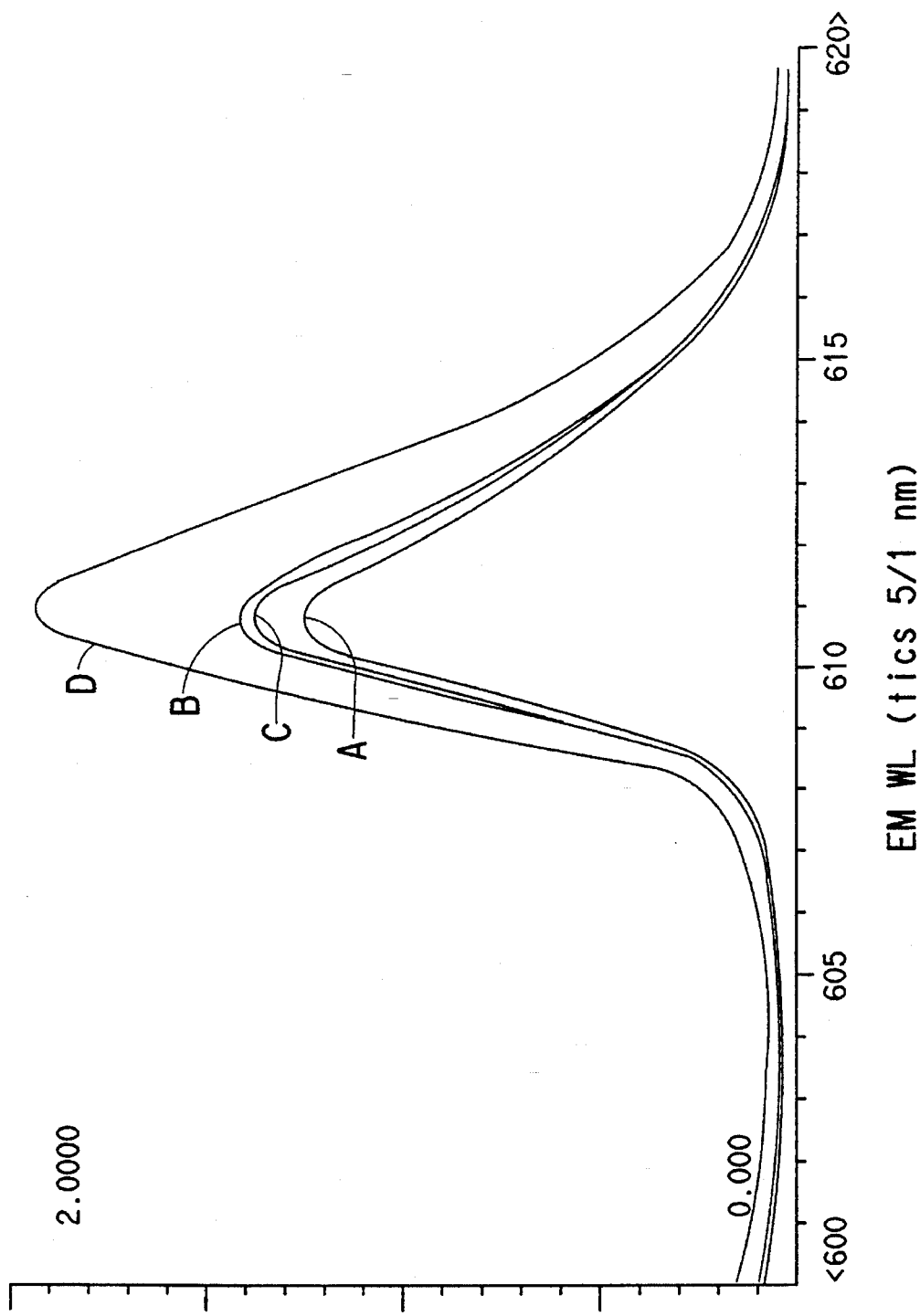
FIG. 6—FIG. 6 is a graphical representation of the relative intensities R(I) of the products formed in accordance with Examples 1–3, and the commercially available product shown in FIG. 1.

FIG. 6 is a graphical representation of the R(I) spectrums in terms of emission wavelength (x-axis) and R(I) (y-axis), for the conventional powder shown in FIG. 1, and powders which were formed in accordance with Examples 1– 3. Curves "A" through "C" of FIG. 6 correspond, respectively, to R(I) spectrums which were emitted by powders which were formed by Examples 1–3, and Curve "D" corresponds to a R(I) for the commercial phosphor shown in FIG. 1. The R(I) spectrums or curves were generated by using a SLM-8000 spectrometer that was operated at the following settings: Exictation Resolution=4 nm, Emission Resolution=4 nm, Increment=0.2 μm, Integration Time=0.1 sec, Measured Function=C/B, Gain Channel C=10, High Voltage C=420, Gain Channel B=100, and High Voltage B=505. A review of Curves A–D illustrates that the powders of the present invention are capable of achieving R(I) values approximately 65 to 70% of conventional bulk phosphor powders, while using a significantly less total amount of luminescent material.

Example 4

This example describes a method of making a phosphor containing barium sulfate coated with approximately 0.38 wt % Eu and 9.62 wt % $YVO_4$ based on the phosphor.

D,L-Malic acid (approximately 7.67 g ,0.0566 mole) was dissolved in a solution of about 15.7 g of 37% hydrochloric acid and 2.4 g of deionized water. The solution was heated to about 45° C., and about 5.16 g(0.0283 mole) of vanadium pentoxide (99.9% $V_2O_5$) was added to the solution over a period of about 1 hr., while maintaining a temperature of about 45°–70° C., thereby producing a dark blue solution.

In a separate beaker D,L- malic acid (approximately 10.5 g, 0.0775 mole) was dissolved in 200 g of deionized water.

A solution of yttrium oxide in aqueous hydrochloric acid (approximately 31.9 g, 20% $Y_2O_3$; 22.57% HCl), and a solution of europium oxide in aqueous hydrochloric acid (approximately 2.62 g, 20% $Eu_2O_3$; 20.72% HCl), were added to the malic acid solution while being agitated and maintaining a temperature of about 25° C. The previously described blue vanadium solution was poured into the agitated solution along with about 40 g of deionized water. A sodium hydroxide solution (approximately 65.1 g, 30% NaOH; 0.4883 mole), was also added to the agitated solution in a dropwise manner while maintaining a temperature of about 25° C. A greenish black chelate solution, which had a pH of about 8.0, was obtained, that was in turn diluted to about 600 g by adding deionized water.

A portion of the greenish black chelate solution (approximately 500 g) was added to a slurry comprising about 90 g of barium sulfate particles (known as "F" Grade, a precipitated barium sulfate supplied by Sachtleben Corp., which had been calcined previously at 700° C. and treated with 10% hydrochloric acid), into 500 g of deionized water. A sodium hydroxide solution (approximately 23.3 g, 30% NaOH; 0.1748 mole), was added to the slurry while maintaining a temperature of about 25° C. over a period of about 30 min. The slurry, which had a pH of about 11.8, was heated further under reflux to a temperature of about 101° C. for 8 hrs. After cooling to about 25° C., a tan colored slurry was obtained, which had a pH of about 12.2, that was filtered and the filter cake washed with 10 liter of deionized water. The filter cake was dried at a temperature of about 120° C. to produce about 100 g of a cream colored solid having a surface area of about 17.7 m2/g. A portion of the solid was calcined at about 1,100° C. for 30 minutes to produce a light yellow powder.

Figure 7:
FIG. 7—FIG. 7 is an optical photomicrograph at 1,000× magnification of a portion of the product formed in accordance with Example 4.

Referring now to FIG. 7, FIG. 7 is an optical photomicrograph at 1,000× magnification of a portion of the powder formed according to Example 4. FIG. 7 shows a variety of different sized particles of $BaSO_4$, which have unequal amounts of Eu:$YVO_4$ phosphor crystallites deposited thereon.

Figure 8:
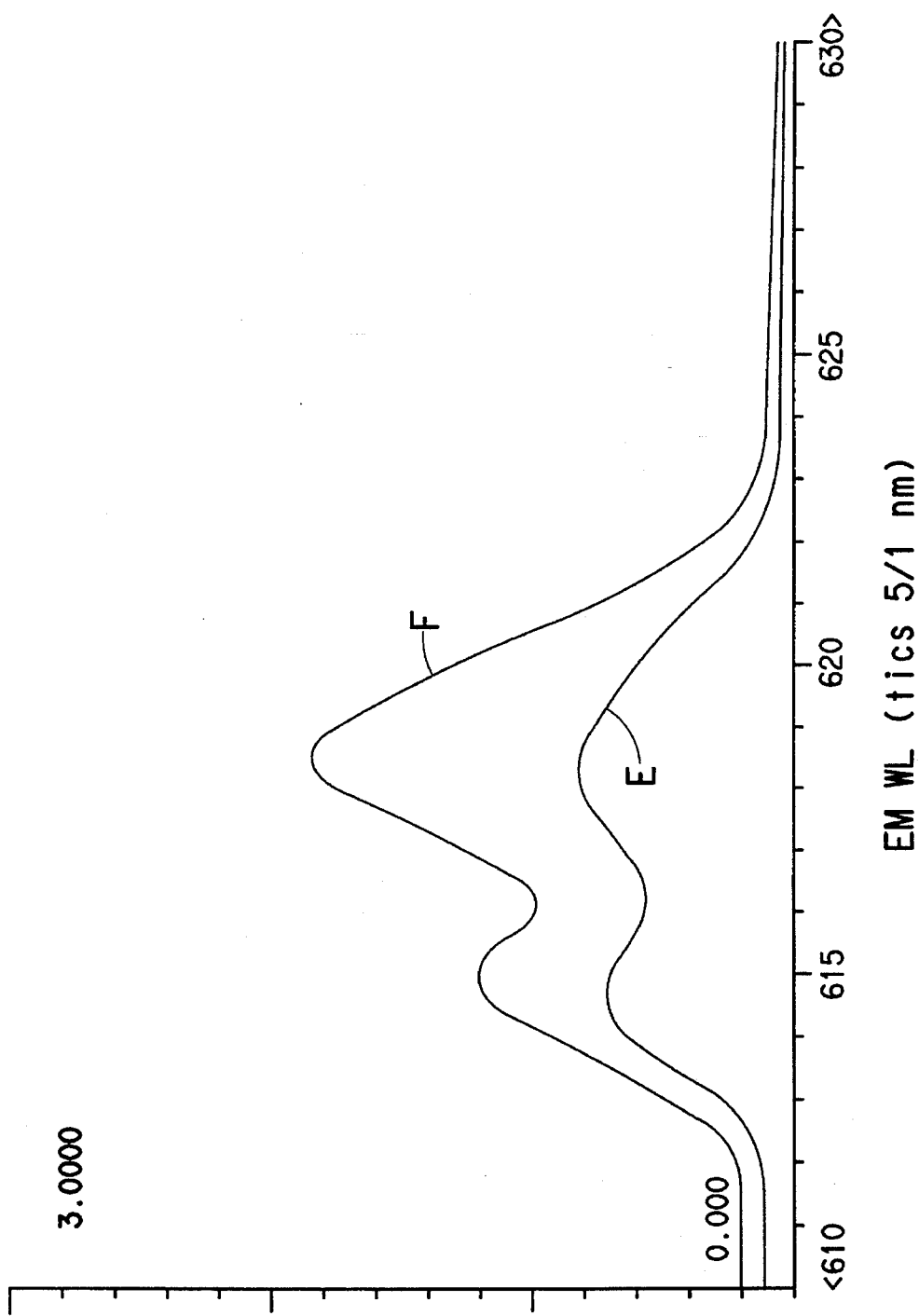
FIG. 8—FIG. 8 is a graphical representation of the relative intensities R(I) of the product formed in accordance with Example 4, and a commercially available bulk phosphor product.

FIG. 8 is a graphical representation of the R(I) spectrums, in terms of emission wavelength (x-axis) and R(I) (y-axis), for a portion of the powder formed in accordance with Example 4, and a commercially available powder comprising $YVO_4$ containing approximately 4 wt. % $Eu_2O_3$, which was supplied by GTE, under the trademark "Sylvania Type 2390". In FIG. 8, Curve "E" corresponds to the R(I) emitted by the powder of Example 4, whereas Curve "F" corresponds to the R(I) emitted by the Sylvania Type 2390 powder. The R(I) was generated by using a SLM-8000 spectrometer, which used settings corresponding substantially to those set forth in Example 3. FIG. 8 shows that the powder formed according to Example 4 is capable of emitting a R(I) which is about 45 to 60% of commercially available phosphor materials.

Example 5

This example describes a procedure for making a $Y_2O_3$:Eu phosphor composition coated onto a $BaSO_4$ substrate by a dry powder process.

The two substantially dry powders which are employed in this example comprise $BaSO_4$ (supplied by Sachtleben Corp. Blanc Fixe Micro Grade), which had been calcined previously at about 900° C. for one hour and then hammer milled, and a europium doped yttrium oxalate powder that was formed substantially in accordance with the oxalate process described in Example 3; except that the oxalate powder was not deposited upon a core material.

About five grams of the oxalate was dry mixed in an alumina crucible with about 15 grams of the $BaSO_4$, and then calcined in air at a temperature of about 1200° C. for one hour. The final composition of this phosphor is essentially about $Y_2O_3$:Eu(5)/$BaSO_4$(84) which corresponds to an approximately 16 wt % coating of a 5 mole % europium doped yttria upon barium sulfate particles. The R(I) of a sample of the powder formed by the method of Example 5 was determined substantially in accordance with the procedure discussed in Example 1, and indicated a peak at about 1.64.

Example 6

This Example describes preparing a phosphor of barium sulfate particles that were coated with about 1.48 wt % $Eu_2O_3$ and 8.52 wt % $Y_2O_3$ based on the phosphor which was obtained by using an oxalate process.

The barium sulfate particles which were used in this example are Blanc Fixe N Grade (a precipitated barium sulfate supplied by Sachtleben Corp.). The barium sulfate was treated prior to coating by being calcined at a temperature of about 700° C. for 1 hr., and hammer milled. The calcined barium sulfate was slurried into about 4% aqueous hydrochloric acid at a temperature of about 60° C. for about 1 hr, followed by washing with deionized water, and drying at a temperature of about 100° C.

A sample of the dried barium sulfate (about 90 g) was slurried into about 1500 ml of deionized water, and the slurry was agitated overnight while maintaining a temperature of about 25° C. The slurry was then heated to about 90° C.

A first solution was prepared by combining a solution of yttrium oxide in aqueous hydrochloric acid (approximately 42.6 g, 20% $Y_2O_3$; 22.57% HCl), a solution of europium oxide in aqueous hydrochloric acid (approximately 7.38 g, 20% $Eu_2O_3$; 20.72% HCl) with about 50 g of deionized water at a temperature of about 25° C. A second solution was prepared by dissolving about 17.3 g (0.1384 mole) oxalic acid dehydrate into 46 g of deionized water at about 60° C. The first and second solutions were added simultaneously to the previously described barium sulfate slurry over a period of about 2 hrs while maintaining the temperature of the reaction mixture at about 90° C. The resulting white slurry was heated under reflux (102° C.) for about 6 hrs.

After cooling the slurry to a temperature of about 25° C., the white slurry was filtered, and the filter cake was washed with about 4 liters of deionized water. The filter cake was dried at a temperature of about 120° C., thereby forming about 108.9 g of a white solid having a surface area of about 1.2 m2/g, and a particle size distribution of: D90, 9.24 μm; D50, 4.99 μm; and D10, 1.96 μm.

A portion of the dried white powder was calcined in air at a temperature of about 1200° C. for 10 min., which produced another white powder with a surface area of about 0.32 m2/g, and a particle size distribution of: D90, 28.9 μm; D50, 9.91 μm; and D10, 2.21 μm.

Figure 9:
FIG. 9—FIG. 9 is an optical photomicrograph at 600× magnification of a portion of the product formed in accordance with Example 6.

Referring now to FIG. 9, FIG. 9 is an optical photomicrograph at 600× magnification taken under crossed-nicols, and with an immersion oil, which has a refractive index of 1.64, of a powder formed according to Example 6. FIG. 9 shows two major $BaSO_4$ particles, which are birefringant, and appear bright white on a black background. The relatively large particle possesses a less dense coating of Eu:$Y_2O_3$ phosphor crystals, whereas the density of Eu:$Y_2O_3$ phosphor crystallites is greater on the smaller particle.

Figure 10:
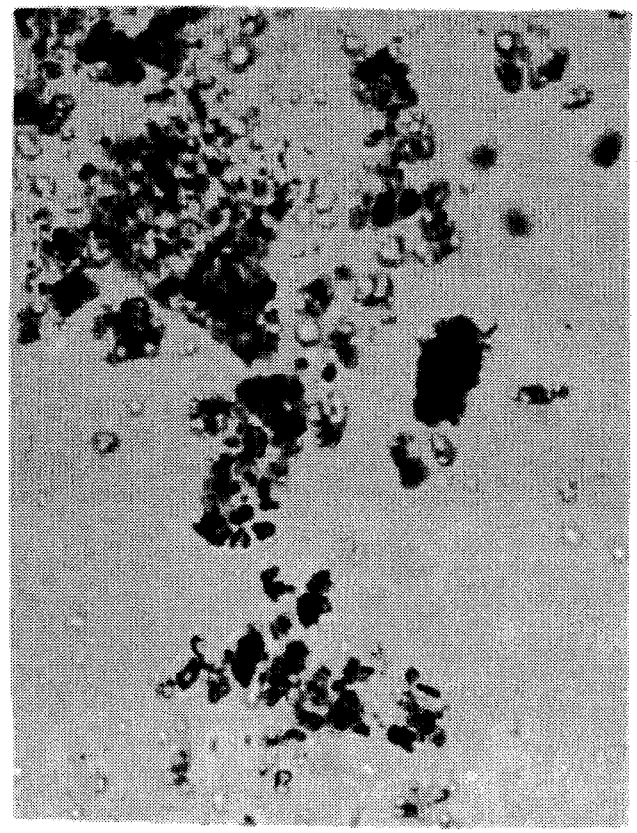
FIG. 10—FIG. 10 is an optical photomicrograph at 600× magnification of a portion of the product formed in accordance with Example 6.

FIG. 10 is an optical photomicrograph of the same powder shown in FIG. 9, with the exception that FIG. 10 was taken without the crossed-nicols. Because the refractive index of the immersion oil is substantially equivalent to the refractive index of $BaSO_4$, the $BaSO_4$ particles were essentially invisible in FIG. 10, and only the relatively small and dark phosphor crystallites are clearly visible. The phosphor crystallites are more easily seen in FIG. 10 because the refractive index of Eu:$Y_2O_3$ is much greater than 1.64.

Figure 11:
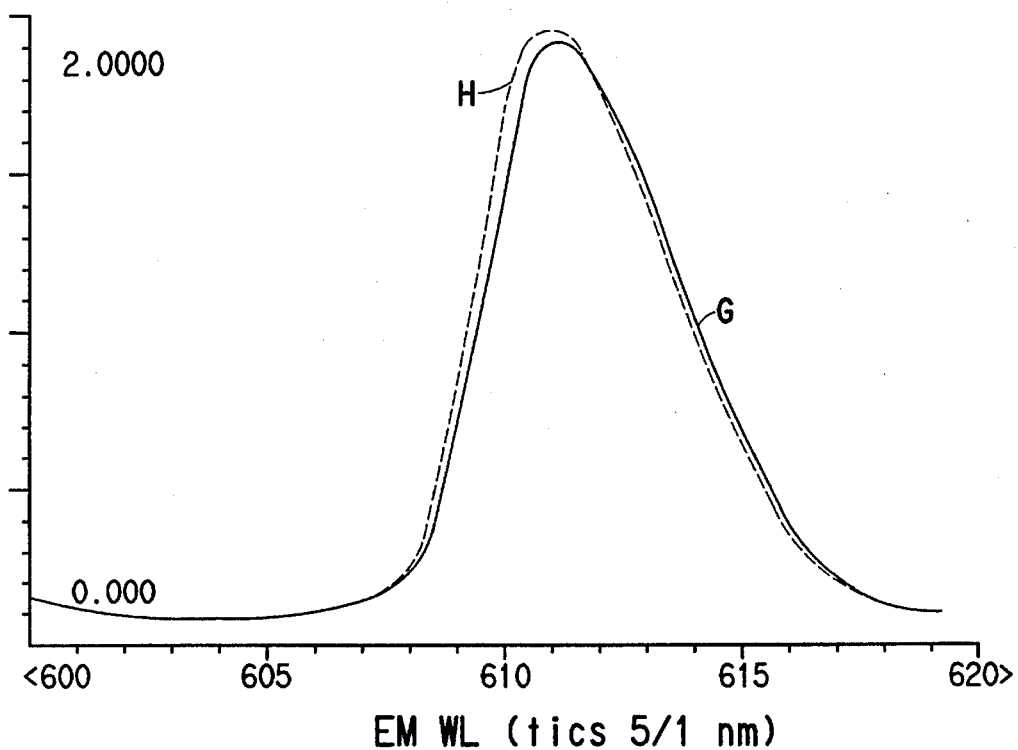
FIG. 11—FIG. 11 is a graphical representation of the relative intensities R(I) of the product formed in accordance with Example 6, and the commercially available product shown in FIG. 1.

The R(I) of the powder shown in FIGS. 9 and 10 was measured substantially in accordance with the method described in Example 1. FIG. 11 is a graphical representation, in terms of emission wavelength (x-axis) and R(I) (y-axis), of the powder shown in FIGS. 9 and 10, as well as the commercially available powder shown in FIG. 1. Curve "H" on FIG. 11 corresponds to the emitted R(I) for the powder shown in FIG. 1, whereas Curve "G" corresponds to the emitted R(I) for the powder made in accordance with Example 6. The R(I) was generated by using a SLM-8000 spectrometer which was operated substantially at the settings set forth in Example 3.

A review of FIG. 11 demonstrates that the composition of the invention is capable of achieving a peak R(I) value, i.e., about 2.0, which is commensurate with commercially available phosphors.

Example 7

A. This part of the Example illustrates that the phosphor coated powders of the invention achieve an improved measured R(I) over an uncalcined mechanical mixture of $BaSO_4$ and Eu:$Y_2O_3$.

About 4 grams of commercially available $BaSO_4$, and about 1 gram of Eu:$Y_2O_3$ (supplied by GTE as Sylvania Type 2340), were mechanically dry mixed together by shaking in a glass vial. The resultant powder contained a total of about 20% by weight phosphor. The peak measured R(I) of Eu:$Y_2O_3$ portion of the mixed powder, prior to being mixed with $BaSO_4$, was about 1.96, and the peak R(I) of the mixed powder was about 0.54.

For purposes of comparison, a luminescent composition of the invention was prepared substantially in accordance with Example 1 which comprised a coating of about 5 mole % Eu:$Y_2O_3$ upon the $BaSO_4$ powder. The coating corresponded to about 20% by weight of the total phosphor coated product. After being calcined at a temperature of about 1,100° C. in air for a period of about 4 hours, the phosphor coated product of the invention had a peak R(I) of about 1.57. Based upon the measured R(I) intensities, the calcined inventive composition can employ an equivalent weight of phosphor as the dry mechanical mixture and yet achieve superior intensities.

B. This part of the Example illustrates calcining and acid treating $BaSO_4$ which was used in a dry mechanical mixture of $BaSO_4$ and Eu:$Y_2O_3$.

Approximately 4200 grams of commercially available $BaSO_4$ (supplied by Sachtleben N-grade powder), was calcined in air at a temperature of about 700° C. for one hour. The calcined powder was then granulated by being passed through a "Brinkmann" mill using a number 2.0 mesh screen. The granulated powder was then washed by slurrying the powder into a 10% HCl solution for one hour. The slurry powder was washed with deionized water until the conductance of the filtrate was less than about 50 umhos.

A mechanical mixture was prepared using approximately 3.6 grams of the acid washed $BaSO_4$ and about 0.4 grams of commercially available $Eu:Y_2O_3$ powder (Supplied by GTE as 2340). The mixture was obtained by rolling the two powders together in a small glass vial for about 5 minutes. The measured R(I) for the mixture, which corresponded to an about 10 wt % $Eu:Y_2O_3$ blend, was about 0.65. This is a significant improvement over the 20 wt % $Eu:Y_2O_3$ blend described in Example 7A wherein the R(I) was about 0.54. This part of the Example demonstrates that a calcined and acid washed core particle can achieve a higher R(I) while employing about one-half the amount of $Eu:Y_2O_3$ phosphor.

Figure 12:
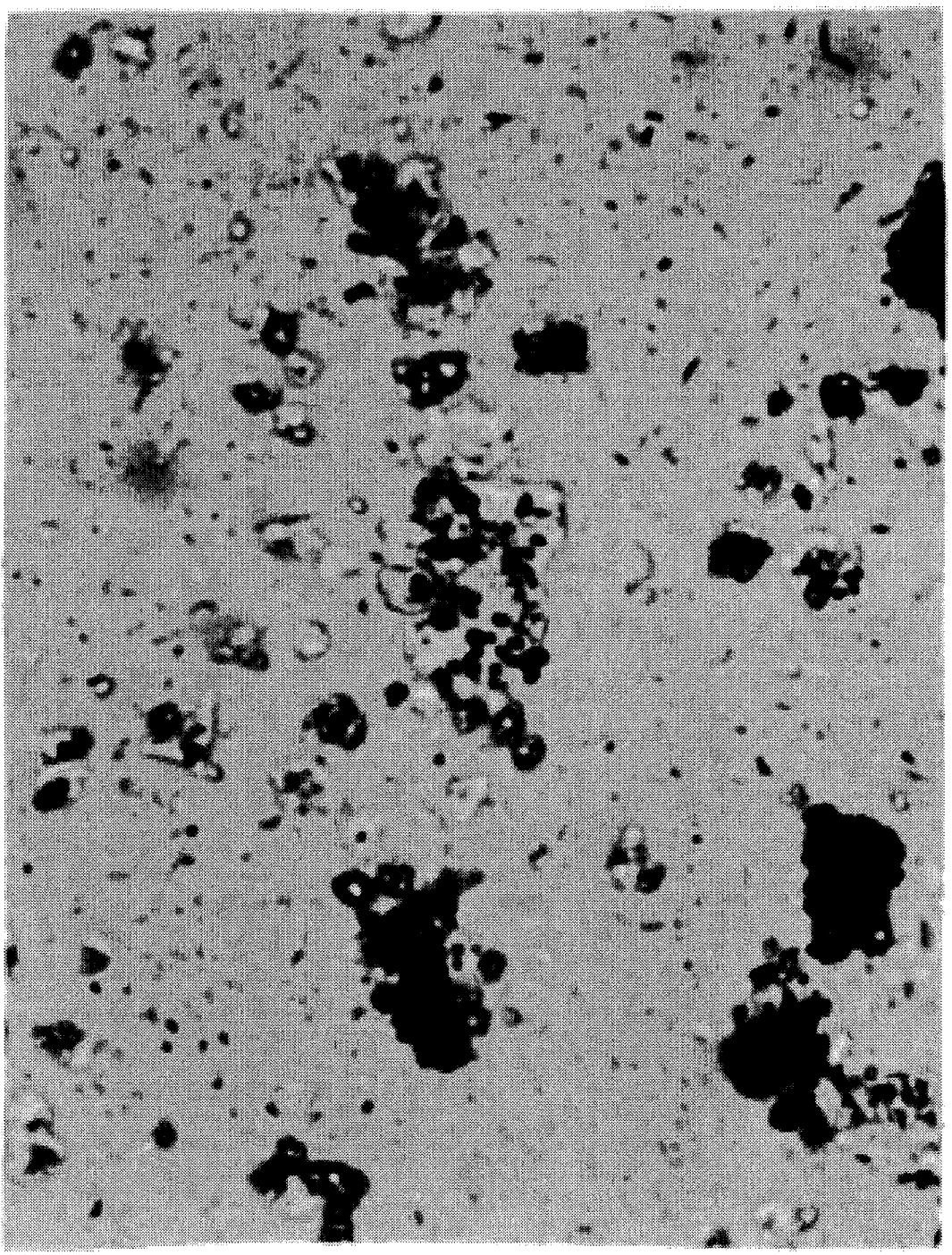
FIG. 12—FIG. 12 is an optical photomicrograph at 600× magnification of a portion of the product formed in accordance with Example 7B.

A portion of the above blend was then calcined in air at a temperature of about 1200° C. for about 30 minutes, and was observed to have an R(I) of about 1.38. The bulk commercially available GTE 2340 phosphor has an RI equal to about 2.0. Referring now to FIG. 12, FIG. 12 is an optical micrograph that was taken at 600× magnification show that the larger $Eu:Y_2O_3$ crystallites are present as agglomerates or individual particles whereas the relatively smaller crystallites (those less than about 2 microns) are embedded onto the surface of the $BaSO_4$ particles. The coating characteristics range from substantially no crystallites on the relatively small $BaSO_4$ particles to a spotty or random crystallite coating on the larger $BaSO_4$ particles. Unlike the previous Examples wherein calcining the coated powder was used to crystallize and activate the phosphor, in this Example, the luminescent material is already activated crystallites, and the calcination step is used for improving R(I).

Example 8

This example describes a method for making a luminescent composition comprising barium sulfate coated with approximately 2.04 wt % $Eu_2O_3$ and 24.86 wt % $Y_2O_3$ based on the phosphor.

Barium sulfate (approximately 73 g) was slurried in about 1500 ml of deionized water, and the slurry was agitated at about 25° C. overnight in a nitrogen atmosphere. The barium sulfate for this experiment was Blanc Fixe Micro Grade, a precipitated barium sulfate supplied by Sachtleben Corp. The barium sulfate slurry was warmed to a temperature about 90° to 95° C.

A solution comprising yttrium oxide in aqueous hydrochloric acid (about 125.3 g, 19.48% $Y_2O_3$; 22.69% HCl) and europium oxide in aqueous hydrochloric acid (about 10.46 g, 19.49% $Eu_2O_3$; 20.83% HCl) was prepared. This solution was added simultaneously with about 82.5 g (0.6189 mole) of 30% aqueous sodium hydroxide solution to the barium sulfate slurry while maintaining the pH of the slurry at about 8.0 to 8.5. The resultant white slurry, which had a pH of about 8.2, was heated under reflux to about 100° C. for about 6 hrs.

After cooling the white slurry to approximately 25° C. (pH about 9.6) about one half of the slurry was filtered, and displacement washed with about 1000 ml of deionized water. The resultant filter cake was dried at a temperature of about 120° C., thereby producing about 49.8 g of a white solid having a surface area of about 10.9 m2/g. A portion of the white solid was ground in a mortar and pestle, and calcined in air at a temperature of about 1,100° C.

The R(I) of a sample of the powder was determined substantially in accordance with the procedure discussed above, and a peak with an intensity of about 1.09 was measured.

The other half of the slurry was filtered and washed with about 15,000 ml of deionized water. The filter cake was dried at a temperature of about 120° C., thereby producing about 50.8 g of a white solid having a surface area of about 17.2 m2/g. A portion of the white solid was ground in a mortar and pestle, and calcined in air at a temperature of about 1,100° C. The R(I) of a sample of the powder was measured, and determined to be about 1.05.

Example 9

This example describes a method for making a luminescent composition comprising barium sulfate coated with approximately 1.48 wt % $Eu_2O_3$ and 8.52 wt % $Y_2O_3$ based on the phosphor.

Deionized water (about 270 ml) and approximately 29.6 g (0.2181 mole) of D,L- malic acid were charged to a 1-liter flask under a nitrogen atmosphere and maintained at a temperature of about 25° C. A chelate solution comprising yttrium oxide in aqueous hydrochloric acid (about 85.2 g, 20% $Y_2O_3$; 22.57% HCl) and a solution of europium oxide in aqueous hydrochloric acid (about 14.8 g, 20% $Eu_2O_3$; 20.72% HCl) were added to the 1-flask while being agitated. The resulting substantially clear solution was allowed to agitate at about 25° C. for about 15 min.

Aqueous potassium hydroxide solution (about 146.4 g, 30% KOH, 0.7827 mole) was added to the solution in a dropwise fashion over a period of about 40 minutes while maintaining a temperature of about 25° C. The resultant solution, which was substantially colorless, had a pH of about 8.0 and was diluted to about 600 g with deionized water.

Barium sulfate (about 87 g) was slurried in about 483 g of deionized water and maintained in a nitrogen atmosphere at about 25° C. The barium sulfate was Blanc Fixe Micro Grade from Sachtleben Corp., which had been calcined at about 800° C. for 1 hr with about 30% potassium chloride, extracted with 10% hydrochloric acid, washed with deionized water and dried. An aqueous potassium hydroxide solution (about 21.7 g, 30% KOH, 0.12 mole) was added to the slurry of barium sulfate.

A portion (14.5 g) of the above described yttrium-europium chelate solution was added to the slurry over a period of about 2 hrs. at a temperature of about 25° C. The slurry was agitated for about two days. The slurry was warmed to a temperature of about 91° C., and then about 275.5 g of the yttria-europia chelate solution was added over a period of about 75 minutes. The resultant white slurry was heated further under reflux at about 101° C. for about 6 hrs.

After cooling to about 25° C., a white slurry was obtained which had a pH of about 12.1. The slurry was filtered, and the filter cake washed with about 17 liters of deionized water. The filter cake was dried to produce about 99 g of a white solid having a surface area of about 12.7 m2/g, and a particle size distribution of: D90, 9.39 µm; D50, 5.99 µm; D10, 4.06 µm.

A portion of the white solid was calcined in air at a temperature of about 1200° C. for about 30 minutes. The resultant white powder had a surface area of about 0.75 m2/g, and a particle size distribution of: D90, 10.8 µm; D50, 6.28 µm; D10, 3.05 µm. The R(I) of a sample of the powder was measured substantially in accordance with the method discussed above, and was determined to be about 1.14.

The Example described above was repeated with the exception that all operations were carried out in an air atmosphere instead of nitrogen. The R(I) of the of the resulting white powder was determined to be about 1.41.

Example 10

This example describes a procedure for making a Eu:$Y_2O_3$ luminescent composition coated onto a CaO substrate.

The two raw material sources were a $CaCO_3$ (supplied by J. T. Baker), and a europium doped yttrium oxalate powder. About one gram of $CaCO_3$ was dry mixed together with about 0.15 g of europium doped yttrium oxalate (5 mole % $Eu_2O_3$), and then calcined in air at a temperature of about 1150° C. for a period of about 30 minutes. The calcined composition comprised about Eu(5):$Y_2O_3$/CaO(93) which indicates the formation of an approximately 7 wt. % coating of a 5 mole % europia doped yttria on CaO.

Without wishing to be bound by any theory or explanation, it is believed that during calcination $CaCO_3$ converts or decomposes to CaO and $CO_2$. As a result, it is believed that the core particles comprised CaO. It is also believed that when the CaO core particles are exposed to air, at least a portion of the CaO will convert to $Ca(OH)_2$ and in turn partially form $CaCO_3$.

The R(I) of this composition was measured by using the previously described method, and determined to be about 0.9. The measured particle size distribution of the composition was about D10=2.4 u, D50=8.6 u, and D90=88 u.

Example 11

This example describes a procedure for making a Eu:$Y_2O_3$ luminescent composition coated onto a CaO core particle.

The two raw material sources were a europium doped yttrium oxalate powder and a $CaCO_3$ (supplied by J. T. Baker), which had been calcined at a temperature of about 900° C. for a period of about one hour. After calcining the $CaCO_3$, it is believed that a majority of the $CaCO_3$ converted or decomposed, and formed CaO with trace amounts of $Ca(OH)_2$ and $CaCO_3$.

About one gram of the calcined CaO was dry mixed together in a glass vial with about 0.25 grams of europia doped yttrium oxalate (5 mole % $Eu_2O_3$), and then calcined in air at a temperature of about 1150° C. for a period of about 30 minutes. The resultant composition comprised approximately Eu(5):$Y_2O_3$/CaO(89) which indicates that an approximately 11 wt. % coating of a 5 mole % europia doped yttria was formed on CaO. The measured R(I) of the composition was about 1.2, and the particle size distribution of the composition was about D10=0.94 u, D50=3.9 u, and D90=11.6 u.

Example 12

This example describes a procedure for making a Eu:$Y_2O_3$ phosphor composition coated onto an MgO substrate.

The two raw material sources comprised MgO (supplied by Alpha Company), and a europium doped yttrium oxalate powder. Approximately 0.8 grams of MgO was wet mixed together with about 0.2 g of europia doped yttrium oxalate (approximately 5 mole % $Eu_2O_3$). The oxalate was prepared substantially in accordance with the method described above in Example 3. The materials were wet mixed using about 5 to 10 grams of deionized water and shaking in a small glass vial for about 5 minutes. The mixture was then poured into an alumina boat and calcined at a temperature of about 1150° C. for 30 minutes.

The calcined composition comprised about Eu(5):$Y_2O_3$/MgO(88.5). The composition corresponded to an approximately 11.5 wt % coating of a 5 mole % europia doped yttria upon a core particle comprising MgO.

The measured R(I) of this sample was determined to be about 0.6, and the measured particle size distribution was about D10=7 u, d50=12 u, and d90=22 u.

Example 13

This example describes a procedure for making a two component phosphor that comprised a green phosphor particle, which has a red light-emitting phosphor coating, that emits visually perceived white light when illuminated with a suitable source of UV radiation.

The two raw material sources comprised an europia doped yttrium oxalate (approximately 5 mole % $Eu_2O_3$) powder and a commercial GTE 2291 green phosphor having the composition comprising $(Ce,Tb)MgAl_{11}O_{19}$. The oxalate component was prepared substantially in accordance with the method described above in Example 3. Approximately 1.6 grams of the oxalate was dry mixed with about 0.4 grams of the GTE 2291 powder by shaking them together in a glass vial for about 5 minutes.

The powder mixture was placed into an alumina boat and calcined in air at a temperature of about 1150° C. for a period of about 30 minutes. The calcined mixture comprised approximately Eu(5):$Y_2O_3$/$(Ce,Tb)MgAl_{11}O_{19}$ (32.4). The mixture corresponded to an approximately 67.6 wt % coating of a 5 mole % europia doped Yttria coated onto a core particle comprising $(Ce,Tb)MgAl_{11}O_{19}$.

The luminescent properties of the calcined mixture were tested by using a commercially available hand held UV lamp which emitted short wavelength light. The calcined powder visually appeared white when illuminated with UV light from the hand held UV lamp.

The particle size distribution of this powder was about 1.5/5/12 u (d10/d50/d90), whereas the PSD for the GTE 2291 powder was measured to be about 4.5/9/15 u. The measured R(I) of this sample was about 1.2 at 612 nm, which is the primary red emission line for Eu:$Y_2O_3$, and about 0.9 at 543 nm, which is the primary emission line for the GTE 2291 phosphor.

Example 14

A. This example illustrates a method for blending a red light emitting coated barium sulfate, Eu:$Y_2O_3$/$BaSO_4$, with a green light-emitting phosphor powder for making a composite luminescent material that emits visually perceived white light when excited with short wavelength UV radiation.

A Eu(10):$Y_2O_3$/$BaSO_4$(90) powder was prepared substantially in accordance with the method described above in Example 3 and a calcined and acid washed barium sulfate core particle. The resultant powder had a measured R(I) of about 2.0. This powder served as the red component of the two powder blend. The green component comprised commercially available GTE 2291 $(Ce,Tb):MgAl_{11}O_{19}$.

The dry blend, which comprised approximately 1.8 grams of the red component and 0.2 grams of the green component, was prepared by shaking the two powders together in a glass vial for about 10 minutes. The resultant dry blend contained about 90 wt % of the red component which corresponds to about 1.35 wt % $Eu_2O_3$ and 7.65 wt % $Y_2O_3$. The blend was observed visually to emit a white light when illuminated with short wavelength UV light from a hand held UV lamp.

B. For comparison a second dry blend was made by using a commercially available GTE 2340 phosphor (Eu:$Y_2O_3$) as the red component of the blend. The GTE 2340 sample was analyzed using ICP analysis and found to contain about 4.6 wt % $Eu_2O_3$ and 95.4 wt % $Y_2O_3$.

A blend comprising approximately 0.5 grams of the GTE green component and 1.5 grams of the GTE red component was prepared substantially in the manner described in part A of this Example. The blend comprised about 75 wt % of the red phosphor which corresponds to about 3.45 wt % $Eu_2O_3$ and 71.55 wt % $Y_2O_3$. The resultant blend was observed visually while being exposed to short wavelength UV light, and determined to emit a white light substantially the same as that observed in Example 14A.

This example illustrates that substantially the same white light can be emitted from a luminescent composition comprising red light emitting phosphor coated powder, Eu(10):$Y_2O_3$/$BaSO_4$(90), instead of bulk Eu:$Y_2O_3$ powder. However, the luminescent composition of this Example requires significantly less total amounts of $Eu_2O_3$ and $Y_2O_3$ such that using the coated powder of this Example realizes a marked phosphor cost reduction. Additional cost savings are realized because about 15 wt % less of the green phosphor, which contains $Tb_2O_3$, was used in this part of the Example.

Example 15

This example describes a composition comprising Eu:$Y_2O_3$ coated onto CaO particles that exhibited cathodoluminescent properties.

An Eu(10):$Y_2O_3$/CaO luminescent composition was prepared substantially in accordance with the method described in Example 11 with the exception that a 10 mole % europia doped yttrium oxalate powder, which was made substantially in accordance with the oxalate process described in Example 3, were used as starting materials. Approximately 0.8 grams of the CaO, 0.2 grams of the europium doped yttrium oxalate, and 5 ml of deionized water were slurried together in a small glass vial by rolling for about 5 minutes. The slurry was poured into an alumina boat and calcined at a temperature of about 1200° C. for 30 minutes. The final composition corresponded approximately to Eu(10):$Y_2O_3$/CaO (89)

A sample of the previously described powder and a commercially available phosphor (GTE 2340 Eu:$Y_2O_3$) powder were each placed separately into a 1 inch square stainless steel die and pressed at about 8 tons for 2 minutes in a "Wabash" press. The pressed powders were then used for determining whether or not each powder possessed cathodoluminescence. The pressed powder samples were individually mounted onto a pedestal, and placed within a Philips 515 Scanning Electron Microscope. Each sample was scanned using an electron beam which was set at 25 kV, 400 uA, and a 100 nm spot size. The cathodoluminescence detectors inside the Microscope are capable of detecting light between about 300 and 650 nm. Black and white photos of the electron beam-scanned samples were used to qualitatively assess the comparative cathodoluminescent efficiency of the samples. The degree of whiteness on the photo, which is believed to correlate directly with the red luminescent emission, e.g., about 611 nm for Eu:$Y_2O_3$, were observed visually to be substantially equivalent.

Example 16

This example describes a phosphor composition comprising europium doped $Y_2O_3$ coated onto a fluorite, $CaF_2$, core particle.

Approximately 100 grams of commercially available Johnson Matthey calcium fluoride (99.95%) was placed into an alumina boat and calcined in air at a temperature of about 1000° C. for about 30 minutes. The calcined powder was granulated by being passed through a Brinkmann mill using a number 0.5 screen and was observed visually to have a slight gray metallic color; apparently as a result of metal contamination from the granulator.

Approximately 50 grams of the granulated and screened powder washed in a 5% HCl solution for about 30 minutes and then washed substantially with deionized water. The washed powder was dried in a an oven at a temperature of about 120° C. The dried powder was observed visually to be white and substantially nonagglomerated.

A dry mechanical mixture was made using about 3.2 grams of the calcined fluorite and approximately 0.8 grams of a bulk oxalate having an approximate composition comprising (Eu[10],Y)$_2$(C$_2$O$_4$)$_3$, wherein the [10] refers to 10 mole %. The bulk oxalate was prepared substantially in accordance with the method described above in Example 3. The two powders were dry mixed in a glass vial by rolling them together for about 15 minutes. The mixed powders were placed into an alumina boat and calcined in air at a temperature of about 1100° C. for one hour.

The composition of calcined product comprised approximately Eu(10):$Y_2O_3$/$CaF_2$(88.5), which corresponds to an about 11.5 wt % coating of a 10 mole % europia doped yttria upon a calcined $CaF_2$ core particle. The measured R(I) of this powder was about 1.98.

This Example was repeated with the exception that a bulk oxalate containing only about 5 mole % $Eu_2O_3$ was used. The resultant product comprised Eu(5):$Y_2O_3$/$CaF_2$(88.5), and a measured R(I) of about 1.81.

The above examples illustrate that the luminescent composition of the invention may be employed in virtually unlimited array of applications; especially in applications wherein it is desirable to reduce phosphor costs such as a plasma display panel (PDP). In particular, the composition of the invention can reduce phosphor costs by being employed in the PDP processes and apparatus described in U.S. patent application Ser. Nos. 08/109,874, filed on Feb. 26, 1993 in the names of Hiroshi Tamemasa et al. and entitled "Method of Making Plasma Display Apparatus", and 08/109,879, filed on Aug. 21, 1992 in the names of William Borland et al. and entitled "Plasma Display Apparatus and Process of Making the Same"; the entire disclosure of these U.S. Patent Applications is hereby incorporated by reference. These applications relate to a PDP comprising a plurality of striped-shaped electrodes that are arranged in a matrix, a dot-shaped discharge or pixel area at each solid intersection of the electrodes and a fluorescent film formed upon each of the discharge areas, wherein the fluorescent film is adapted to emit light when the film is excited by ultraviolet rays from the discharge area. The luminescent composition of the invention can be mixed into a paste or slurry that is used to form a fluorescent film that is applied upon the discharge areas described in the previously identified patent applications.

Figure 13:
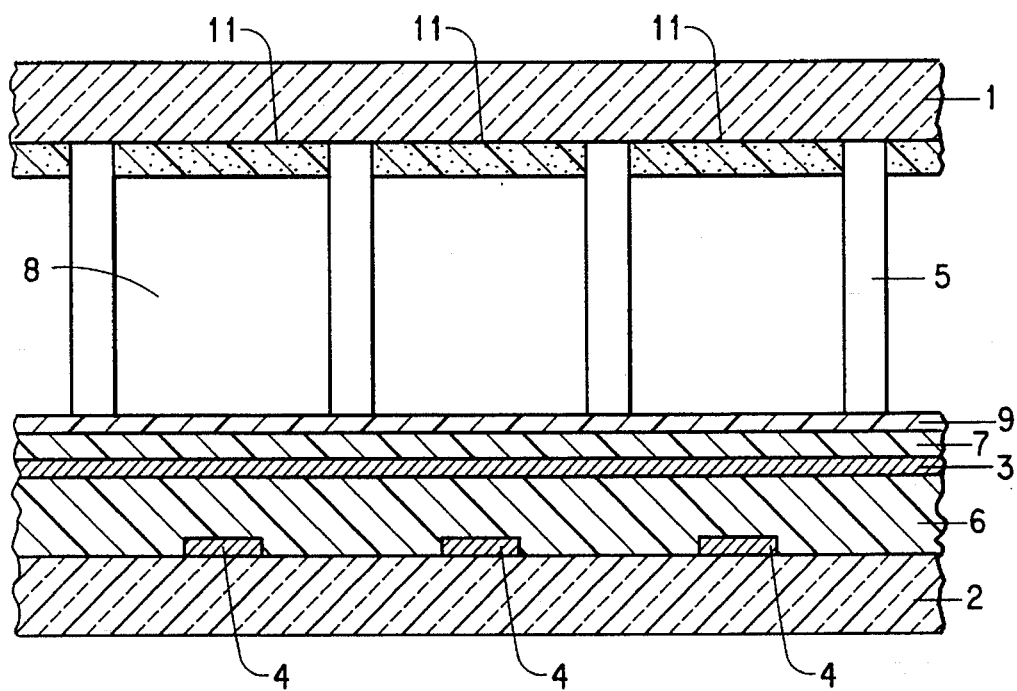
FIG. 13—FIG. 13 is an elevational view of a section of a plasma display panel.

This aspect of the invention is better understood by reference to FIG. 13. Referring now to FIG. 13, FIG. 13 shows a PDP comprising spaced apart glass substrates 1 and 2, a plurality of electrodes 3 laterally extending along the inner face of substrate 2 and a plurality of electrodes 4 longitudinally extending on the inner face of substrate 2. The intersection of electrodes 3 and 4 forms a discharge area. A matrix-like ridge 5 defines a plurality of pixel areas and is adapted to provide a partition wall for maintaining a space between substrates 1 and 2. The electrodes 3 are normally disposed upon dielectric layer 6 that is located upon substrate 2 Another dielectric layer 7 is arranged over the electrodes 3 to define one end of the discharge space 8 that is filled with any suitable gas, e.g., a mixture of neon and xenon. In some cases, a protective layer 9 is provided upon dielectric layer 7 or protective layer 7 The fluorescent film 10 is located in recesses 11 a manner that permits converting discharged ultraviolet rays into visible light. While the fluorescent film 10 can be located in the recesses by any suitable method, normally the luminescent composition of the invention is formed into a paste or slurry and introduced into the recesses. Examples of suitable luminescent compositions include an effective amount of at least one of $Zn_2SiO_4$:Mn, $(Y_2O_3$:Eu), $BaMg_2Al_{16}O_{27}$, $MgAl_{11}O_{19}$(Ce, Tb), (Y,Gd)$BO_3$:Eu among others, that have been coated upon an inert core particle, such as barium sulfate. The paste or slurry is prepared by mixing the luminescent composition of the invention with an effective amount of an organic vehicle, e.g., a mixture of one or more commercially available polymers, plasticizer and solvents such as described in Ser. Nos. 08/109,874 and 08/109,879. The ratio of luminescent composition to organic vehicle in the paste must be sufficient to allow the composition to become dispersed within the vehicle and permit the paste to be applied as a substantially uniform layer in recesses 11. The organic component of the paste is removed thereby forming fluorescent film 10.

While certain aspects of the invention have been described in detail one of ordinary skill would recognize that other aspects or embodiments and variations are encompassed by the appended claims.

The following is claimed:

1. In a flat plasma display panel wherein the improvement comprises a fluorescent film comprising a luminescent powder composition comprising particles with an inert core and at least one luminescent coating on said inert core, the coating comprising about 2 through about 30 weight percent of the powder composition, wherein the core comprises at least one member from the group consisting of barium sulphate, calcium sulphate, magnesium oxide, and calcium fluoride, and the average diameter of the core particles ranges from about 0.5 to about 10 microns.

2. The powder composition of claim 1 wherein the inert core comprises barium sulfate and the luminescent coating comprises at least one member from the group consisting of $Zn_2SiO_4$:Mn, $(Y_2O_3$:Eu), $BaMg_2Al_{16}O_{27}$, $MgAl_{11}O_{19}$(Ce, Tb) and (Y,Gd) $BO_3$:Eu.

3. The powder composition of claim 1 wherein the inert core comprises barium sulfate and the luminescent coating comprises at least two members from the group consisting of $Zn_2SiO_4$:Mn, $(Y_2O_3$:Eu), $BaMg_2Al_{16}O_{27}$, $MgAl_{11}O_{19}$(Ce, Tb) and (Y,Gd) $BO_3$:Eu.

4. The plasma display panel of claim 1 wherein the luminescent coating comprises at least one member selected from the group consisting of $(Y_2O_3$:Eu), $(Y_2O_2S$:Eu), $(YVO_4$:Eu), $(Zn_2SiO_4$:Mn), $(BaMg_2Al_{16}O_{27}$:Eu), $(SrB_4O_7$:Eu), $(CeO_{.65}TbO_{.35})$:$MgAl_{11}O_{19}$, (ZnS:Cu), (ZnS:Ag), (MgWO$_4$), barium titanium phosphate, Sn and Eu activated alkaline earth ortho and pyrophosphates, Sb and/or Mn activated calcium halophosphates, and (La,Ce, Tb)(PO$_4$)$_3$:(Ce,Tb).

5. The plasma display panel of claim 1 wherein the inert core comprises at least one member selected from the group consisting of barium sulfate, magnesium oxide, calcium fluoride, and calcium sulfate.

6. The plasma display panel of claim 1 wherein the coating comprises 5 to 20 wt % of the powder composition and the average diameter of the inert core ranges from 1.0 to 10 microns.

7. The plasma display panel of claim 1 wherein the surface of the inert core includes a barrier coating between the inert core and the luminescent powder coating.

8. The plasma display panel of claim 1 wherein about 90 wt % of the inert core have a diameter which ranges from at least about 0.1 D to 10.0 D, wherein D is the weight average particle diameter.

9. The plasma display panel of claim 1 wherein the inert core comprises barium sulfate.

10. The plasma display panel of claim 9 wherein the luminescent coating comprises $(Y_2O_3$:Eu).

11. A paste composition comprising a luminescent powder composition comprising particles with an inert core and at least two successive luminescent coatings on said inert core, the coatings comprising about 2 through about 30 weight percent of the luminescent powder composition, wherein the average diameter of the core particles ranges from about 0.5 to about 10 microns; and an amount of an organic vehicle that is effective to disperse said luminescent powder composition wherein the inert core comprises at least one member selected from the group consisting of an alkaline earth sulfate, alkaline earth phosphate, mixed metal oxides, and alkaline earth fluoride.

12. The paste composition of claim 11 wherein the luminescent coatings comprise at least one member selected from the group consisting of $(Y_2O_3$:Eu), $(Y_2O_2S$:Eu), $(YVO_4$:Eu), $(Zn_2SiO_4$:Mn), $(BaMg_2Al_{16}O_{27}$:Eu), $(SrB_4O_7$:Eu), $(CeO_{.65}TbO_{.35})$:$MgAl_{11}O_{19}$, (ZnS:Cu), (ZnS:Ag), (MgWO$_4$), barium titanium phosphate, Sn and Eu activated alkaline earth ortho and pyrophosphates, Sb and/or Mn activated calcium halophosphates, and (La,Ce, Th)(PO$_4$)$_3$:(Ce,Tb).

13. The paste composition of claim 11 wherein the inert core comprises at least one member selected from the group consisting of barium sulfate, magnesium oxide, calcium fluoride, and calcium sulfate.

14. The paste composition of claim 11 wherein the coatings comprise 5 to 20 weight percent of the luminescent composition and the average diameter of the core particles ranges from 1.0 to 10 microns.

15. The paste composition of claim 11 wherein the surface of the inert core includes a barrier coating between the inert core and the luminescent coatings.

16. The paste composition of claim 11 wherein about 90% by weight of the inert core have a diameter which ranges from at least about 0.1 D to 10.0 D, wherein D is the weight average particle diameter.

17. The paste composition of claim 11 wherein the inert core comprises barium sulfate.

18. The paste composition of claim 17 wherein the luminescent coatings comprise $(Y_2O_3$:Eu).

19. A plasma display panel containing the paste composition of claim 11.

\* \* \* \* \*